US012616928B2

(12) United States Patent
Tronnes et al.

(10) Patent No.: US 12,616,928 B2
(45) Date of Patent: May 5, 2026

(54) FILTER ELEMENT WITH IMPROVED DUST LOADING

(71) Applicant: Donaldson Company, Inc., Bloomington, MN (US)

(72) Inventors: Gregory S. Tronnes, Bloomington, MN (US); Robert M. Rogers, Minnetonka, MN (US); Aflal Rahmathullah, Savage, MN (US)

(73) Assignee: Donaldson Company, Inc., Bloomington, MN (US)

( * ) Notice: Subject to any disclaimer, the term of this patent is extended or adjusted under 35 U.S.C. 154(b) by 474 days.

(21) Appl. No.: 18/028,482

(22) PCT Filed: Sep. 27, 2021

(86) PCT No.: PCT/US2021/052198
§ 371 (c)(1),
(2) Date: Mar. 24, 2023

(87) PCT Pub. No.: WO2022/067180
PCT Pub. Date: Mar. 31, 2022

(65) Prior Publication Data
US 2023/0364546 A1 Nov. 16, 2023

Related U.S. Application Data

(60) Provisional application No. 63/084,516, filed on Sep. 28, 2020.

(51) Int. Cl.
*B01D 46/52* (2006.01)
*B01D 39/16* (2006.01)
(Continued)

(52) U.S. Cl.
CPC ....... *B01D 46/523* (2013.01); *B01D 39/1623* (2013.01); *B01D 39/18* (2013.01);
(Continued)

(58) Field of Classification Search
None
See application file for complete search history.

(56) References Cited

U.S. PATENT DOCUMENTS 4,576,853 A 3/1986 Vaughn et al.
4,701,197 A * 10/1987 Thornton ............... B01D 46/62
210/493.5
(Continued)

FOREIGN PATENT DOCUMENTS

CN 101668576 A 3/2010
CN 103505942 A 1/2014
(Continued)

OTHER PUBLICATIONS

International Application No. PCT/US2020/025467 filed Mar. 27, 2020, PCT International Preliminary Report on Patentability mailed Sep. 28, 2021, 10 pages.
(Continued)

*Primary Examiner* — Gabriel E Gitman
(74) *Attorney, Agent, or Firm* — Mueting Raasch Group

(57) ABSTRACT

Embodiments disclosed herein relate to a pleated filter element having filter media having a downstream layer of filter material and an upstream layer of fibers. A spacing structure defines a void space between the upstream layer of fibers and the downstream layer of filter material.

20 Claims, 17 Drawing Sheets

(51) Int. Cl.
    *B01D 39/18* (2006.01)
    *B01D 46/00* (2022.01)
(52) U.S. Cl.
    CPC ....... *B01D 46/0005* (2013.01); *B01D 46/525*
        (2013.01); *B01D 2239/0216* (2013.01); *B01D*
        *2239/0654* (2013.01); *B01D 2239/0681*
        (2013.01); *B01D 2239/10* (2013.01); *B01D*
        *2239/1233* (2013.01); *B01D 2239/1291*
        (2013.01)

(56) References Cited

U.S. PATENT DOCUMENTS

| | | | |
|---|---|---|---|
| 4,702,940 | A | 10/1987 | Nakayama et al. |
| 5,554,287 | A | 9/1996 | Beck et al. |
| 5,683,794 | A | 11/1997 | Wadsworth et al. |
| 5,721,180 | A | 2/1998 | Pike et al. |
| 5,785,725 | A | 7/1998 | Cusick et al. |
| 5,800,586 | A | 9/1998 | Cusick et al. |
| 6,010,766 | A * | 1/2000 | Braun ............... B29C 66/81433 |
| | | | 428/182 |
| 6,528,439 | B1 | 3/2003 | Stokes et al. |
| 6,716,274 | B2 | 4/2004 | Gogins et al. |
| 6,762,138 | B2 | 7/2004 | Ferreira et al. |
| 6,994,742 | B2 | 2/2006 | Barris et al. |
| 7,008,465 | B2 | 3/2006 | Graham et al. |
| 7,501,003 | B2 | 3/2009 | Muller et al. |
| 7,556,663 | B2 | 7/2009 | Niakan |
| 7,641,055 | B2 | 1/2010 | Ferrer et al. |
| 7,645,329 | B2 | 1/2010 | Niakan et al. |
| 9,056,268 | B2 | 6/2015 | Jones et al. |
| 9,446,340 | B2 | 9/2016 | Babcock et al. |
| 9,474,994 | B2 | 10/2016 | Gao et al. |
| 2003/0010002 | A1 | 1/2003 | Johnson et al. |
| 2003/0150199 | A1 | 8/2003 | Tanaka et al. |
| 2007/0175192 | A1 | 8/2007 | Niakan et al. |
| 2008/0017038 | A1 | 1/2008 | Wu |
| 2008/0148699 | A1 | 6/2008 | Sazawa et al. |
| 2008/0202078 | A1 | 8/2008 | Healey et al. |
| 2008/0276805 | A1 | 11/2008 | Lotgerink-Bruinenberg |
| 2009/0272084 | A1 | 11/2009 | Healey et al. |
| 2010/0006498 | A1 | 1/2010 | Duello et al. |
| 2010/0065236 | A1 | 3/2010 | Henriksson et al. |
| 2010/0107881 | A1 | 5/2010 | Healey et al. |
| 2013/0001155 | A1 | 1/2013 | Neubauer et al. |
| 2013/0341290 | A1 | 12/2013 | Yu et al. |
| 2014/0326661 | A1 | 11/2014 | Madsen et al. |
| 2015/0290561 | A1 | 10/2015 | Barsness et al. |
| 2015/0375150 | A1 | 12/2015 | Sahbaee et al. |
| 2016/0023146 | A1 | 1/2016 | Hampton et al. |
| 2016/0038865 | A1 | 2/2016 | Jones et al. |
| 2016/0051918 | A1 | 2/2016 | Walz et al. |
| 2016/0059167 | A1 | 3/2016 | Nagy et al. |
| 2016/0136553 | A1 | 5/2016 | Healey et al. |
| 2016/0279550 | A1 | 9/2016 | Agrahari et al. |
| 2017/0232371 | A1 | 8/2017 | Anantharamaiah et al. |
| 2017/0312673 | A1 | 11/2017 | Smith et al. |
| 2017/0319993 | A1 | 11/2017 | Chung et al. |
| 2018/0021716 | A1 | 1/2018 | Li et al. |
| 2018/0272258 | A1 | 9/2018 | Healey et al. |
| 2019/0054412 | A1 | 2/2019 | Rocklitz |
| 2020/0368654 | A1 | 11/2020 | Higginson et al. |
| 2022/0152537 | A1 | 5/2022 | Tronnes et al. |

FOREIGN PATENT DOCUMENTS

| | | | |
|---|---|---|---|
| CN | 106457081 | A | 2/2017 |
| JP | S6224922 | U | 2/1987 |
| JP | H0634719 | U | 5/1994 |
| JP | H07256026 | | 10/1995 |
| JP | 2010520049 | A | 6/2010 |
| JP | 2018510051 | A | 8/2016 |
| JP | 2017538574 | A | 12/2017 |
| JP | 2019013903 | A | 1/2019 |
| WO | 2008106490 | A1 | 9/2008 |
| WO | 2012106659 | A1 | 8/2012 |
| WO | 2016115181 | A1 | 7/2016 |
| WO | 2017196653 | A1 | 11/2017 |
| WO | 2020198681 | A1 | 10/2020 |
| WO | 2022067180 | A1 | 3/2022 |

OTHER PUBLICATIONS

International Application No. PCT/US2020/025467 filed Mar. 27, 2020, PCT International Search Report and Written Opinion mailed Aug. 5, 2020, 15 pages.

International Application No. PCT/US2020/025467 filed Mar. 27, 2020, PCT Invitation to Pay Additional Fees mailed Jun. 9, 2020, 9 pages.

International Application No. PCT/US2020/025467 filed Mar. 27, 2020, PCT Invitation to Pay Additional Fees mailed May 29, 2020, 10 pages.

International Application No. PCT/US2021/052198 filed Sep. 27, 2021, PCT International Preliminary Report on Patentability mailed Mar. 28, 2023, 12 pages.

International Application No. PCT/US2021/052198 filed Sep. 27, 2021, PCT International Search Report and Written Opinion mailed Mar. 4, 2022, 17 pages.

Fu et al., Known Knowledge Evidence 1: "Clean Technology and Architectural Design", May 1986, China Architecture & Building Press, 4 pages (with English machine translation).

Gao, Known Knowledge Evidence 2: "Fermentation Equipment", May 1995, China Light Industry Press, 4 pages (with English machine translation).

Su, Known Knowledge Evidence 3: "Q&A on Factory Dust Prevention Technology", Jun. 1986, China Forestry Publishing House, 4 pages (with English machine translation).

* cited by examiner

FILTER ELEMENT WITH IMPROVED DUST LOADING

CROSS REFERENCE TO RELATED APPLICATIONS

This application is the § 371 U.S. National Stage of International Application No. PCT/US2021/052198, filed 27 Sep. 2021, which claims the benefit of U.S. Provisional Application No. 63/084,516, filed 28 Sep. 2020, the disclosures of which are incorporated by reference herein in their entireties.

TECHNOLOGICAL FIELD

The technology disclosed herein generally relates to filter elements. More particularly, the technology disclosed herein relates to filter elements with improved dust loading.

BACKGROUND

The life of the filter element is limited, at least in part, by the collection of dust and other particulates by the filter media within the filter element. As the volume and mass of the particulates on the upstream face and inside the filter media builds up, the filter media become increasingly resistant to receiving fluid flow. The resistance of airflow through the filter media is reflected by a differential pressure measurement between the upstream side and the downstream side of the filter media if the flow rate is constant, or a reduction in airflow rate if the differential pressure is constant. An increasing differential pressure measurement is indicative of increasing resistance to fluid flow, and a relatively high differential pressure measurement is indicative of the end of the service life of the filter media.

SUMMARY

The technology disclosed herein relates to a filter element that exhibits improved dust loading. The improved dust loading can extend the useful life of the filter element.

Some embodiments relate to a filter element having filter media in a pleated configuration having a first set of pleat folds and a second set of pleat folds. The first set of pleat folds form an upstream face. The second set of pleat folds form a downstream face. The filter media has a perimeter region. The filter media has a downstream layer of filter material and an upstream layer of fibers. The downstream layer of filter material is in a corrugated configuration defining peaks and valleys. The upstream layer of fibers extends across the peaks of the downstream layer of filter material. A void space is defined between the downstream layer of filter material and the upstream layer of fibers. The upstream layer of fibers has less than 10% solidity. A frame component is secured to the perimeter region of the filter media.

In some such embodiments a plurality of fibers in the upstream layer of fibers are crimped. Additionally or alternatively, the upstream layer of fibers has a mean fiber diameter of at least 10 microns. Additionally or alternatively, the downstream layer of filter material has a capture efficiency from 20% to 40%. Additionally or alternatively, the downstream layer of filter material comprises cellulose fibers. Additionally or alternatively, the cellulose fibers comprise wet-laid cellulose fibers. Additionally or alternatively, the downstream layer of filter material comprises synthetic fibers. Additionally or alternatively, the upstream layer of fibers comprises polymeric fibers. Additionally or alternatively, the downstream layer of filter material comprises fibers having a mean fiber diameter from 4 to 30 microns. Additionally or alternatively, the upstream layer of fibers is not self-supporting. Additionally or alternatively, the upstream layer of fibers is an upstream-most layer, and the upstream layer of fibers is in direct contact with the downstream layer of filter material.

Additionally or alternatively, the downstream layer of filter material has a capture efficiency of at least 10%. Additionally or alternatively, the downstream layer of filter material has a mean corrugation depth of less than 2.0 mm. Additionally or alternatively, the downstream layer of filter material defines corrugations having a mean corrugation depth of greater than 0.23 mm. Additionally or alternatively, the upstream layer of fibers is non-corrugated. Additionally or alternatively, the downstream layer of filter material is self-supporting. Additionally or alternatively, a mean void distance is defined between the downstream layer of filter media and the upstream layer of fibers. Additionally or alternatively, the pleat density of the pleats is from 1 pleat per inch to 14 pleats per inch. Additionally or alternatively, there are at least 5 corrugation peaks per pleat. Additionally or alternatively, there are 15 to 200 corrugation peaks per pleat. Additionally or alternatively, the pleats are perpendicular to the corrugation peaks.

Some embodiments of the technology disclosed herein are directed to a method of constructing a filter media. A spacing structure is created on a layer of filter material. A layer of fibers is deposited across the spacing structure of the filter material to form filter media. A void space is defined between the downstream layer of filter material and the layer of fibers. The filter media is pleated to define a first set of pleat folds and a second set of pleat folds, where the first set of pleat folds form an upstream face and the second set of pleat folds form a downstream face. A perimeter region of the filter media is secured to a frame component.

In some such embodiments, the filter material has a capture efficiency of at least 10%. Additionally or alternatively, a plurality of fibers in the layer of fibers are crimped. Additionally or alternatively, the layer of fibers has a mean fiber diameter of at least 10 microns. Additionally or alternatively, the layer of filter material has a capture efficiency from 20% to 40%. Additionally or alternatively, the layer of filter material comprises wet-laid cellulose fibers. Additionally or alternatively, the layer of filter material comprises synthetic fibers. Additionally or alternatively, the layer of fibers is not self-supporting. Additionally or alternatively, the layer of filter material comprises fibers having a mean fiber diameter from 4 to 30 microns. Additionally or alternatively, forming the spacing structure comprises forming corrugations in the filter material. Additionally or alternatively, the layer of filter material is corrugated to have a mean corrugation depth of greater than 0.23 mm.

Additionally or alternatively, the layer of filter material is corrugated to have a mean corrugation depth of less than 1.0 mm. Additionally or alternatively, forming the spacing structure comprises depositing a spacing structure on an upstream surface of the filter material. Additionally or alternatively, the pleat density of the pleats is from 1 pleat per inch to 14 pleats per inch. Additionally or alternatively, there are at least three corrugation peaks per pleat. Additionally or alternatively, there are 5 to 20 corrugation peaks per pleat. Additionally or alternatively, the pleats are perpendicular to the corrugation peaks.

Some other embodiments disclosed herein relate to a filter element having filter media in a pleated configuration having a first set of pleat folds and a second set of pleat folds. The first set of pleat folds forms an upstream face. The second set of pleat folds forms a downstream face. The filter media has a downstream layer of filter material and an upstream layer of fibers. The downstream layer of filter material has a capture efficiency of at least 10%. The upstream layer of fibers has a solidity of less than 10%. A spacing structure defines a mean void distance between the upstream layer of fibers and the downstream layer of filter material greater than 0.11 mm. A frame component is secured to a perimeter region of the filter media.

In some such embodiments, the downstream layer of filter material has a spacing structure protruding in a direction perpendicular to a length and a width of the filter media. Additionally or alternatively, the layer of fibers has a mean fiber diameter of at least 10 microns. Additionally or alternatively, the spacing structure has corrugations defined by the downstream layer of filter material. Additionally or alternatively, the spacing structure is embossments defined by the downstream layer of filter material. Additionally or alternatively, the spacing structure is a deposit disposed between the upstream layer of fibers and the downstream layer of filter material. Additionally or alternatively, the upstream layer of fibers is not self-supporting. Additionally or alternatively, the upstream layer of fibers is non-corrugated.

Additionally or alternatively, the downstream layer of filter material is non-corrugated. Additionally or alternatively, the mean void distance between the upstream layer of fibers and the downstream layer of filter material is less than 1.0 mm. Additionally or alternatively, the pleat density of the pleats is from 1 pleat per inch to 14 pleats per inch. Additionally or alternatively, there are at least three corrugation peaks per pleat. Additionally or alternatively, there are 5 to 200 corrugation peaks per pleat. Additionally or alternatively, the pleats are perpendicular to the corrugation peaks.

It will be understood that downstream and upstream features (e.g. a layer, surface, side, etc.) of the filter media, or a component thereof, are arranged such that, in use, the features are respectively arranged upstream and downstream in a flow direction of a fluid being filtered by the filter media.

Capture efficiency may be determined for a non-pleated flat sheet (which can be corrugated or non-corrugated) in accordance with ASTM Standard F1215-89 with 0.78 micron monodisperse polystyrene latex spherical particles at 20 ft./min. (6.1 meters/min).

"Solidity" as used herein is a percentage of the overall volume of the layer that is composed of solid material (rather than gas and space) at a thickness measured at a particular pressure.

"ISO Fine Test Dust" is dust having a size distribution dictated by standard ISO 12103-1 (2016).

The phrase "spacing structure" as used herein is a structure that defines a region of void, or empty, space between a downstream layer of filter material and an upstream layer of fibers, where a void space or empty space is a volume defining gas and space rather than a solid structure such as the layer of filter media, the layer of fibers, or another material or structure. The spacing structure can be defined by the configuration of the downstream layer of filter material or can be a separate component/material disposed between the downstream layer of filter material and the upstream layer of fibers.

It is noted that the figures are rendered primarily for clarity and, as a result, are not drawn to scale. Moreover, various structure/components, including but not limited to fasteners and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

The present technology may be more completely understood and appreciated in consideration of the following detailed description of various embodiments in connection with the accompanying drawings.

DETAILED DESCRIPTION

The technology disclosed herein relates to a filter media that exhibits improved dust loading on the upstream face of the filter media. The improved dust loading can extend the useful life of the filter media. Filter media consistent with the technology disclosed herein are generally fluid filters. In various implementations, the filter media is specifically directed to particulate filters for gaseous fluid such as air.

Figure 1:
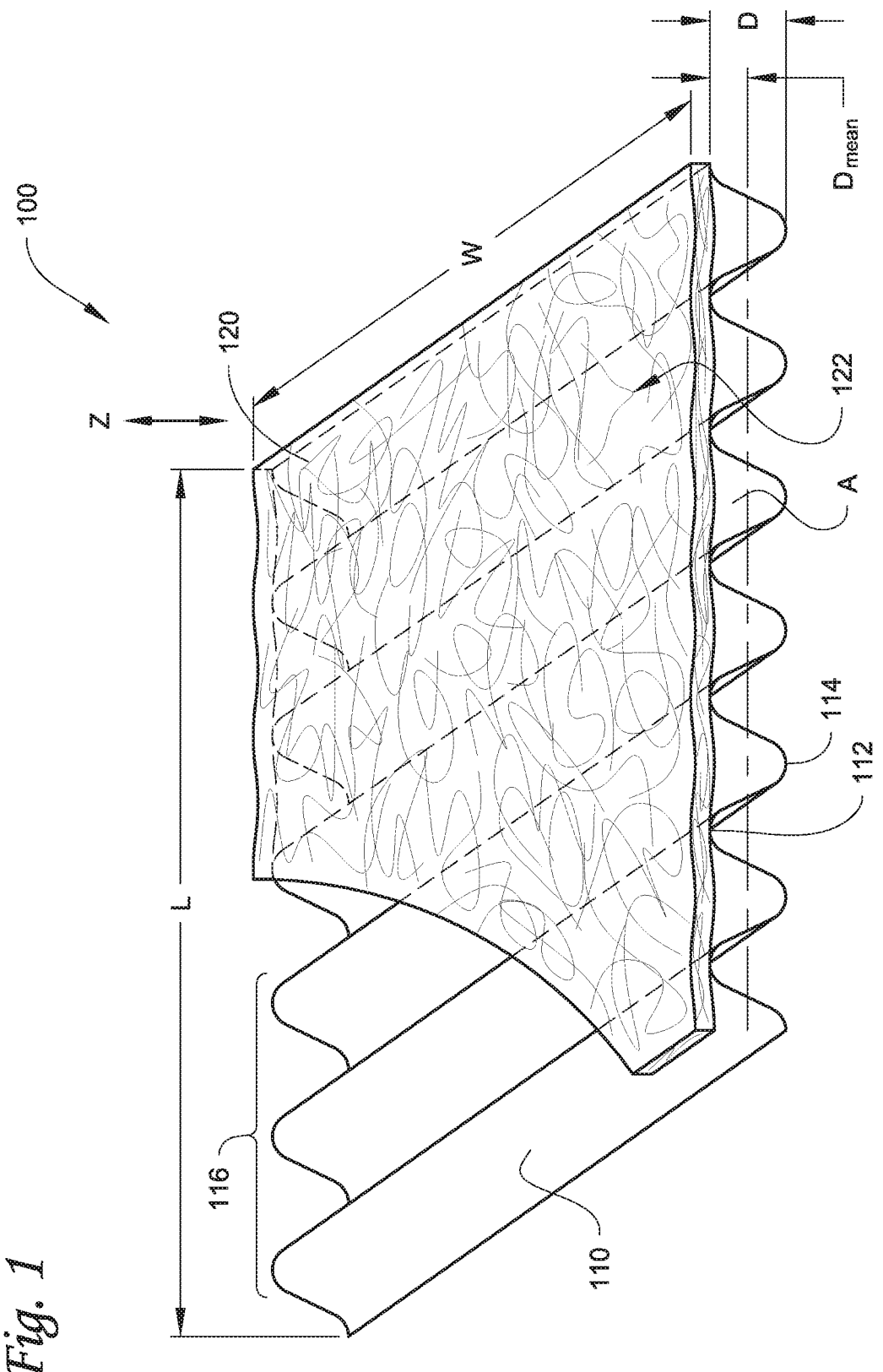
FIG. 1 depicts an example filter media consistent with the technology disclosed herein.

FIG. 1 depicts an example filter media 100 consistent with the technology disclosed herein. The filter media 100 has a downstream layer of filter material 110 and an upstream layer of fibers 120. The downstream layer of filter material 110 is in a corrugated or fluted configuration, where the term "corrugated" in used herein to encompass a fluted configuration. The upstream layer of fibers 120 is generally non-corrugated (non-fluted). The example filter media 100 and corresponding components can have the same components, parameters, and properties as other examples described herein, except where explicitly contradictory.

The downstream layer of filter material 110 can be a variety of types of filter material and combinations of types of filter material. In some embodiments, the downstream layer of filter material 110 contains cellulose fibers. In some embodiments, the downstream layer of filter material 110 contains synthetic fibers. In some embodiments, the downstream layer of filter material 110 contains polymeric fibers. The downstream layer of filter material 110 can incorporate multiple layers of filter material, in various embodiments. In various embodiments, the downstream layer of filter material 110 is self-supporting, meaning that, upon undergoing pleating, the downstream layer of filter material 110 exhibits a stiffness allowing it to maintain a pleated configuration under the force of gravity and/or the forces undergone during filtration operations. In some embodiments, corrugations defined by the downstream layer of filter material 110 increase the stiffness of the filter material 110 to be self-supporting. In an example, the stiffness of the filter material 110 can be quantified using Gurley stiffness, which can be at least 2000 mg in some instances. In some other instances the Gurley stiffness can be under 2000 mg, however. The Gurley stiffness can be calculated using a Gurley stiffness tester meeting industry standards TAPPI #T543 OM-16 (2016) and ASTM D6125-97 (2007).

The sizes of the fibers incorporated in the downstream layer of filter material 110 can be dependent on the fiber types. Generally, the fibers incorporated in the downstream layer of filter material 110 will have a range of fiber diameters. The fibers incorporated in the downstream layer of filter material 110 can have a mean fiber diameter ranging from about 4-30 microns. The mean fiber diameter is determined using Scandium M software by ResAlta Research Technologies based in Golden, Colorado. A portion of the filter media is observed through a scanning electron microscope (SEM) such that 30 sample fibers, and representative diameters, can be identified by a user and noted in the software. The software measures a cross section for each fiber and calculates a mean, minimum, maximum and standard deviation for all fibers chosen. In some embodiments the fibers of the downstream layer of filter material have a mean fiber diameter of at least 20 microns. The fibers incorporated in the downstream layer of filter material 110 can have a mean fiber diameter from 4-20 microns, 10-15 microns, 15-20 microns, 20-25 microns, or 10-30 microns, as examples.

The downstream layer of filter material 110 has a capture efficiency of at least 10%, where the capture efficiency is determined for a non-pleated flat sheet (which can be corrugated or non-corrugated) in accordance with ASTM Standard F1215-89 with 0.78 micron monodisperse polystyrene latex spherical particles at 20 ft./min. (6.1 meters/min). In some embodiments the downstream layer of filter material 110 has a capture efficiency of at least 20%. In some embodiments the downstream layer of filter material 110 has a capture efficiency of at least 90%. In some embodiments the downstream layer of filter material 110 has a capture efficiency between 10% and 80%, 20% and 40%, 60% and 99%, or 30% and 70%.

In one example, the downstream layer of filter material 110 has about 80% cellulose fibers by weight. In some examples, the downstream layer of filter material 110 has about 20% binder by weight. The binder can be latex or acrylic, as examples. The basis weight of the downstream layer of filter material 110 is variable, but in one example the basis weight is 96 g/m$^2$.

The corrugations 116 of the downstream layer of filter material 110 defines a plurality of peaks 112 and valleys 114 that alternate across the length L of the filter media 100. "Peak" and "valley" are used herein is to describe corrugations that protrude in opposite directions. While the corrugations depicted herein are generally sinusoidal, the corrugations can have other shapes. In some embodiments the corrugations can incorporate discontinuities in the curvature of the flutes or corrugations such as one or more fold lines that extend down the length of the corrugation. Furthermore, while the peaks and valleys are generally equal and opposite, in some embodiments the peaks can have a different size than the valleys.

The corrugations of the downstream layer of filter material 110 can have a mean corrugation depth of greater than 0.23 mm. The corrugations of the downstream layer of filter material 110 generally has a mean corrugation depth of less than 4.0 mm. In various embodiments, the filter material 110 has a mean corrugation depth of less than 2.0 mm. The corrugations of the downstream layer of filter material 110 can have a mean corrugation depth of less than 1.5 mm. In some embodiments the corrugations of the downstream layer of filter material 110 has a mean corrugation depth between 0.23 mm and 0.65 mm. A corrugation depth D is defined as the z-direction distance between a peak 112 and an adjacent valley 114 of the filter material 110, where the z-direction is perpendicular to the length L and the width W of the filter material 110. The mean corrugation depth is an average of a sample of corrugations depths measured across the filter material 110, which can have a sample size of at least 5%, 10%, 15% or 20% of the total corrugation depths of the filter material 110.

The upstream layer of fibers 120 generally extends across the peaks 112 of the downstream layer of filter material 110. In various embodiments, the upstream layer of fibers 120 are not adhered to, and remain uncoupled from, the downstream layer of filter material 110. Alternatively, the upstream layer of fibers 120 can be coupled to the peaks 112 with an adhesive in some embodiments and, in other embodiments, the material forming at least a portion of the fibers within the upstream layer of fibers 120 self-adhere to the downstream layer of filter material 110 forming the peaks 112. The upstream layer of fibers 120 can self-adhere when, for example, uncured (or wet) fibers are deposited across the downstream layer of filter material 110 and left to cure (or dry). In some embodiments, the upstream layer of fibers 120 are loose fibers, meaning that the fibers in the upstream layer of fibers 120 are substantially unbonded to each other. In some such embodiments, the fibers in the upstream layer of fibers 120 are completely unbonded to each other. In some embodiments, the upstream layer of fibers 120 can be a scrim material. The scrim material can be woven, non-woven or knit fibers, for example. In some embodiments, the upstream layer of fibers 120 can have one or more layers combining a first layer of fibers with a scrim material, for example.

The upstream layer of fibers 120 generally extends across a substantial portion of the downstream layer of filter material 110. In some embodiments, the upstream layer of fibers 120 extends across the entire downstream layer of filter material 110. While the downstream layer of filter material 110 is corrugated, the upstream layer of fibers 120 is non-corrugated and is generally planar. However, the upstream layer of fibers 120 is not perfectly planar, because portions of the upstream layer of fibers 120 positioned between adjacent peaks 112 of the downstream layer of filter material 110 can sag in response to gravity. Also, some fibers in the upstream layer of fibers 120 can extend outwardly from the plane defined by the length L and width W directions of the filter media 100 and extend beyond the general plane defined by the upstream layer of fibers 120. Generally speaking, the upstream layer of fibers 120 are substantially absent from the valleys 114 of the downstream layer of filter material 110.

The corrugations 116 defined by the downstream layer of filter material 110 are a type of spacing structure that defines void space between the downstream layer of filter material 110 and the upstream layer of fibers 120. In particular, the corrugations 116 define the spacing structure. The upstream layer of fibers 120 extend across peaks defined by the spacing structure, which are the peaks 112 of the corrugations 116. In various embodiments, such void space between the layers can be characterized according to the mean void distance $D_{mean}$ defined between the downstream layer of filter material 110 and the upstream layer of fibers 120. In the example currently depicted, the void distance defined between the downstream layer of filter material 110 and the upstream layer of fibers 120 in the width direction W is generally constant. As such, the mean void distance $D_{mean}$ can be calculated by determining the total cross-sectional area A (in a plane extending in the length L and Z-directions) between the downstream layer of filter material 110 and the upstream layer of fibers 120 along the length L, and then dividing the cross-sectional area A by the length L of the filter media 100.

In some embodiments the mean void distance $D_{mean}$ between the downstream layer of filter material 110 and the upstream layer of fibers 120 is greater than 0.11 mm. The mean void distance $D_{mean}$ between the downstream layer of filter material 110 and the upstream layer of fibers 120 is generally less than 2.0 mm. The mean void distance $D_{mean}$ between the downstream layer of filter material 110 and the upstream layer of fibers 120 can be less than 1.0 mm, in various embodiments. The mean void distance $D_{mean}$ between the downstream layer of filter material 110 and the upstream layer of fibers 120 is can be less than 0.7 mm.

For purposes of the present disclosure, the total cross-sectional area and the mean void distance $D_{mean}$ between the downstream layer of filter material 110 and the upstream layer of fibers 120 is a theoretical calculation that assumes the fibers in the upstream layer of fibers 120 do not extend past the peaks 112 towards the valleys 114 of the downstream layer of filter material 110 (into the void space between the layers 110, 120). In other words, the calculation assumes that the downstream side of the upstream layer of fibers 120 is perfectly planar.

Generally, the solidity of the upstream layer of fibers 120 is less than the solidity of the downstream layer of filter material 110. "Solidity" as used herein is a percentage of the overall volume of the layer that is composed of solid material (rather than gas and space) at a thickness measured at a particular pressure. Solidity is calculated by the following equation:

$$\text{Solidity} = \frac{\text{Density}_{Matrl}}{\text{Density}_{Comp}},$$

where the density of the material (such as the layer of filter material 110 or layer of fibers 120) is divided by the density of the constituent components forming the material (such as the fiber density in the layer of fibers 120). The density of the material can be calculated by the following equation:

$$\text{Density}_{Matrl} = \frac{\text{Basis Weight}_{Matrl}}{\text{Thickness}},$$

where the thickness is of the material (such as the layer of fibers 120). For purposes of the present disclosure, thickness of the material is determined with a no-load caliper (particularly an Ames Thickness Tester manufactured by B.C. Ames Incorporated based in Framingham, Massachusetts) having a diameter of 1.129" (1 square inch) that exerts 0.07 psi on the material. As such, the solidities of the materials as disclosed herein are understood to be calculated based on the 0.07 psi exerted on the material to attain the thickness measurement.

The upstream layer of fibers 120 generally has a solidity of less than 10%. In some embodiments the upstream layer of fibers 120 has a solidity of less than 8%. In some embodiments the upstream layer of fibers 120 has a solidity from 2% to 9%.

The upstream layer of fibers 120 generally has basis weight that is less than the basis weight of the downstream layer of filter material 110. The upstream layer of fibers 120 can have a basis weight from 1 to 45 g/m² or 15 to 40 g/m². In some embodiments the basis weight of the upstream layer of fibers is about 21 g/m² or 30 g/m². In some embodiments the basis weight of the upstream layer of fibers 120 can have a basis weight ranges from 2-10 g/m².

In various embodiments, the upstream layer of fibers 120 contains fibers having a mean fiber diameter of greater than 10 microns. In various embodiments, the upstream layer of fibers 120 contains fibers having a mean fiber diameter of at least 15 microns. In some embodiments the upstream layer of fibers 120 contains fibers having a mean fiber diameter of at least 20 microns with a standard deviation of 2. The upstream layer of fibers 120 contains fibers having a mean fiber diameter of less than 1.0 mm. The upstream layer of fibers 120 generally contains fibers having a mean fiber diameter of less than 0.5 mm. The upstream layer of fibers 120 can contain fibers having a mean fiber diameter of less than 0.1 mm. In some embodiments the upstream layer of fibers 120 can contain fibers that are coarser than the fibers contained in the downstream layer of filter material 110.

The upstream layer of fibers 120 can contain various types of fibers and combinations of fibers. The fibers in the upstream layer of fibers 120 can be substantially continuous, such as meltblown or spunbonded fibers, discontinuous, or combinations thereof. In some embodiments, the upstream layer of fibers 120 are polymeric fibers. In some embodiments, a plurality of the fibers in the upstream layer of fibers 120 are crimped, such as example crimp 122. The crimp 122 in the fiber is a discontinuity in the curvature of the fiber similar to a fold or a crease. Such crimped fibers can add loft to the upstream layer of fibers 120, which can reduce the relative solidity by, for example, increasing the thickness of the upstream layer of fibers 120 or by reducing the basis weight at the same thickness of the upstream layer of fibers 120.

In various embodiments, the upstream layer of fibers 120 is not self-supporting, meaning that the upstream layer of fibers 120 does not exhibit stiffness and cannot be pleated to maintain a pleated configuration under the force of gravity. The upstream layer of fibers 120 can directly contact the downstream layer of filter material 110. The upstream layer of fibers 120 can be directly coupled to the downstream layer of filter material 110, meaning that there are no intervening materials between the upstream layer of fibers 120 and the downstream layer of filter material 110 except for an adhesive (where an adhesive is used).

While the filter media 100 of the present application can incorporate various other constituent layers, in various embodiments, the upstream layer of fibers 120 is the upstream-most layer in the filter media. As such, the upstream layer of fibers 120 is positioned to maximize exposure to dust entering the filter media 100.

Figure 2:
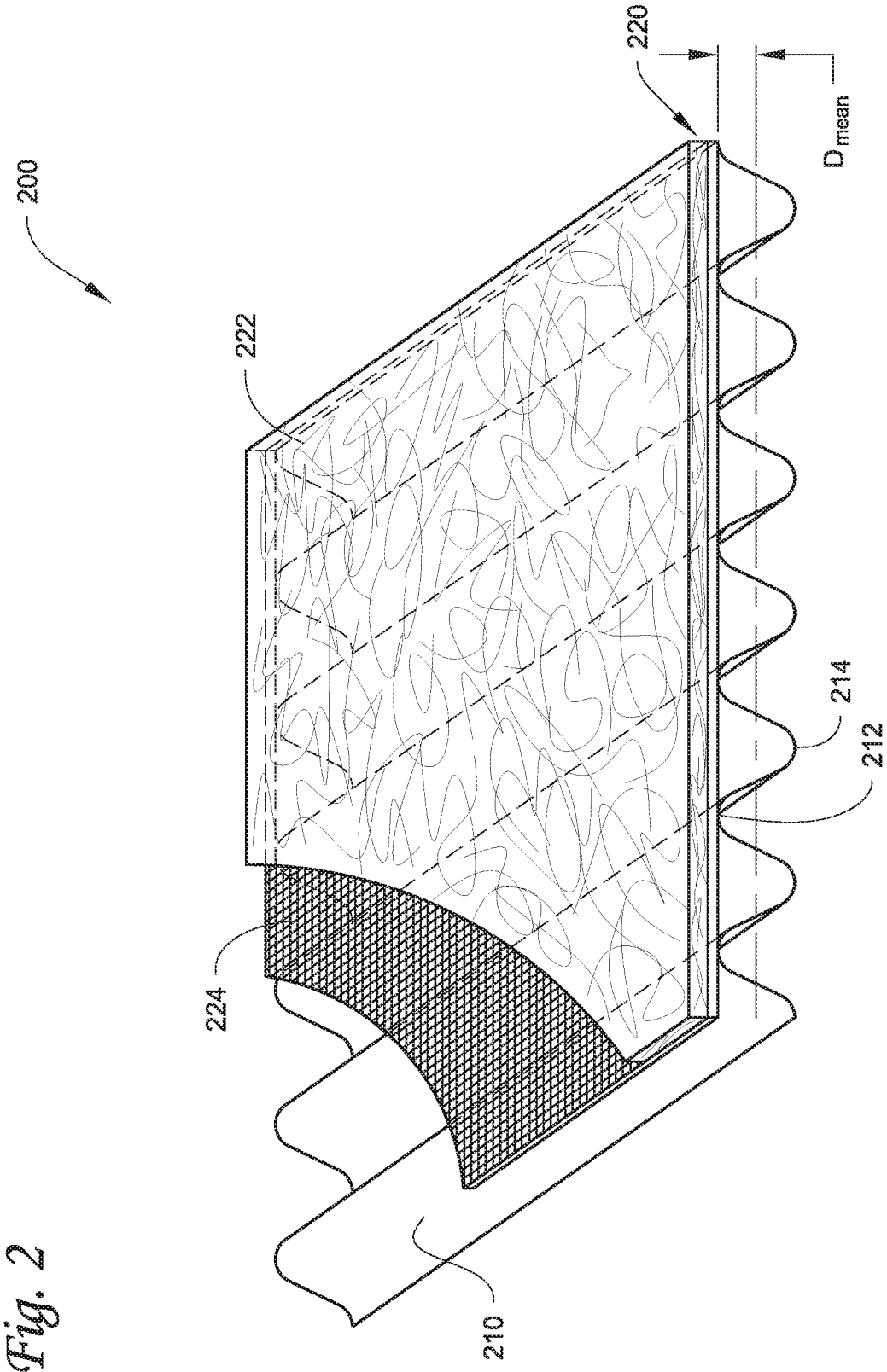
FIG. 2 depicts another example filter media consistent with the technology disclosed herein.

As discussed above, in some embodiments the upstream layer of fibers can have multiple layers, such as a first layer of fibers disposed on a scrim material, which is depicted in FIG. 2. Similar to the embodiment described above with reference to FIG. 1, the currently-described filter media 200 has a downstream layer of filter material 210 and an upstream layer of fibers 220. The downstream layer of filter material 210 is in a corrugated configuration and defines a plurality of alternating peaks 212 and valleys 214 along its length. The upstream layer of fibers 220 extends across the peaks 212 of the downstream layer of filter material 210. The upstream layer of fibers 220 is generally non-corrugated and can be considered generally planar. The example filter media 200 and corresponding components can have the same components, parameters, and properties as other examples described herein, except where explicitly contradictory.

Unlike the embodiment described with reference to FIG. 1, in the current example, the upstream layer of fibers 220 has a first layer of fibers 222 and a support layer 224. The support layer 224 is disposed between the downstream layer of filter material 210 and the first layer of fibers 222. The support layer 224 makes contact with the peaks 212 defined by the corrugations of the downstream layer of filter material 210. The support layer 224 can be coupled to the peaks 212 with adhesive or through alternate approaches, and in some embodiments the support layer 224 and the downstream layer of filter material 210 are uncoupled. In some examples, the support layer 224 is generally self-supporting, meaning that the support layer 224 has stiffness through which the support layer 224 can be pleated, while in other embodiments the support layer 224 is not self-supporting. The support layer 224 can be a variety of materials and combinations of materials and, in some embodiments the support layer 224 is a mesh, such as a wire or polymeric mesh. Generally, the support layer 224 itself does not exhibit a filtering efficiency or pressure drop when filtering 0.78-micron particles.

Figure 3:
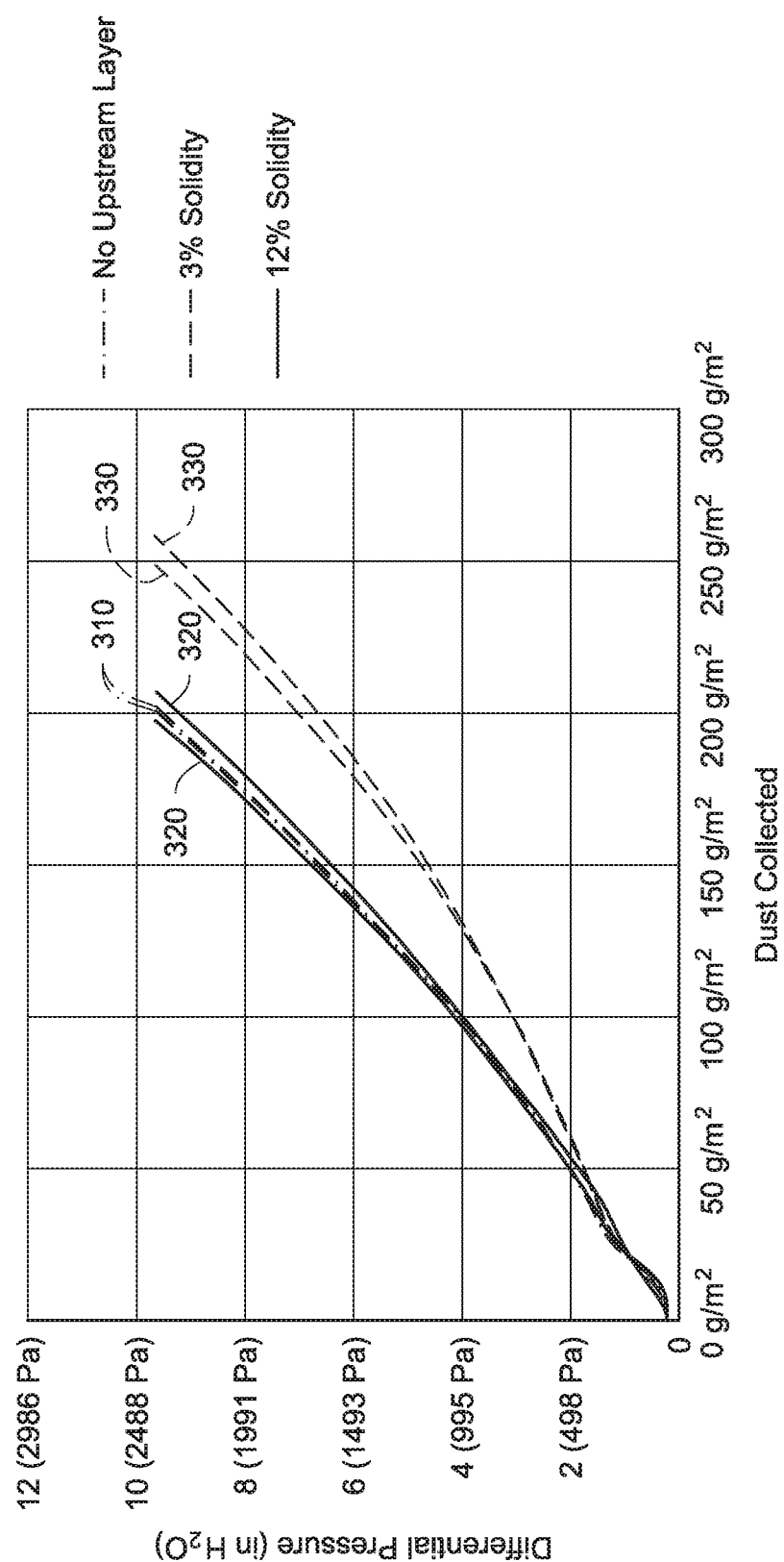
FIG. 3 is a graph showing the relationship between differential pressure and dust collected according to filter media examples.

FIG. 3 depicts test results measuring dust collected and differential pressure for three different example filter medias, using ISO Fine Test Dust. Each of a first comparative example 310, second comparative example 320, and third comparative example 330 each incorporate a non-corrugated downstream layer of filter material that has a relative upstream scrim layer abutting a relative downstream sheet of cellulose media. Each non-corrugated downstream layer of filter material has the same composition and filtration properties.

The first comparative example 310 is the downstream layer of filter material alone. The second comparative example 320 and the third comparative example 330 each incorporate an upstream layer of fibers abutting the downstream layer of filter material. Each upstream layer of fibers contains polyethylene-polypropylene (PE/PP) bicomponent fibers that are wet-laid onto the upstream surface of the scrim layer. A first upstream layer of fibers used in the second comparative example 320 has a solidity of 12%, a basis weight of 21.5 g/m², and a mean fiber diameter of 30.45 microns. A second upstream layer of fibers in the third comparative example 330 has a solidity of 3%, a basis weight of 21.5 g/m², and a mean fiber diameter of 27 microns. For testing each comparative example, the perimeters of the scrim (having the upstream layer of fibers for the second and third comparative examples) and the sheet of cellulose media are clamped together by testing equipment. Each of the comparative examples 310, 320, 330 were tested twice.

The graph of FIG. 3 demonstrates that the third comparative example 330 has lower differential pressure across the filter media than the first comparative example 310 and the second comparative example 320 after loading dust above about 50 g/m². The data suggests that the presence of an upstream layer of fibers having a solidity at 12% does not have a notable impact on the life of the filter media, but the presence of an upstream layer of fibers having a solidity of 3% does have a notable impact on the life of the filter media. In various embodiments consistent with the current technology, the upstream layer of fibers has a solidity of less than 10%.

Figure 4:
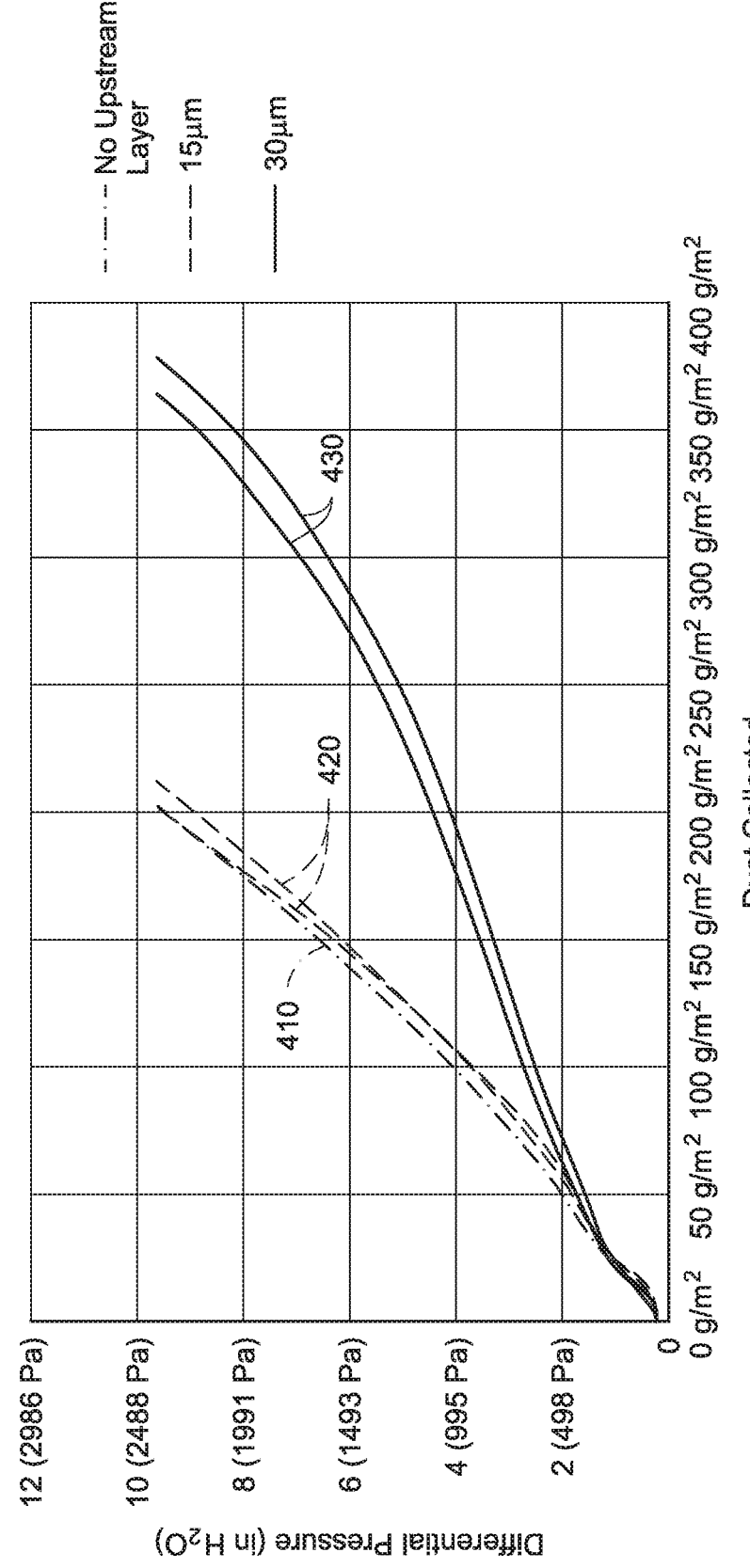
FIG. 4 is a graph showing the relationship between differential pressure and dust collected according to further filter media examples.

FIG. 4 depicts further test results measuring dust collected and differential pressure for three different example filter medias, using ISO Fine Test Dust. A fourth comparative example 410, fifth comparative example 420, and sixth comparative example 430 each uses a non-corrugated downstream layer of filter material discussed above with reference to FIG. 3 (which has a relatively upstream scrim layer abutting a relatively downstream sheet of cellulose media). The fourth comparative example 410 is the downstream layer of filter material alone, where the scrim layer and the cellulose media are clamped together about their perimeters for testing. The fifth comparative example 420 and the sixth comparative example each incorporate an upstream layer of fibers wet-laid onto the scrim layer. A third upstream layer of fibers of the fifth comparative example 420 is polyethylene terephthalate (co-PET) bicomponent fibers having a 21.5 g/m² basis weight, 6% solidity, and fibers having a mean fiber diameter of 15 microns. A fourth upstream layer of fibers of the sixth comparative example 430 is PE/PP bicomponent fibers having a 21.5 g/m² basis weight, a 3% solidity, and fibers having a mean fiber diameter of 30 microns. The testing equipment clamps the scrim having the upstream fiber layer to the sheet of cellulose media about their respective perimeters for testing.

The graph of FIG. 4 demonstrates that the sixth comparative example 430 has a lower differential pressure than the fourth comparative example 410 and the fifth comparative example 420 after loading dust at least above about 50 g/m². The data suggests that the presence of an upstream layer of fibers having a mean fiber diameter of 15 microns does not appear to advantageously impact the life of the filter media, but the presence of an upstream layer of fibers having a mean fiber diameter of 30 microns does appear to advantageously impact the life of the filter media. In some embodiments, the upstream layer of fibers has a mean fiber diameter of greater than 15 microns. In various embodiments consistent with the current technology, the upstream layer of fibers has a mean fiber diameter of at least 20 microns with a standard deviation of 2.

As stated above, ISO Fine Test Dust was used in the testing associated with FIG. 4, where the dust particles have a particular size range and distribution. In some other implementations, where the particles to be filtered have a different size range and/or size distribution than ISO Fine Test Dust, different mean fiber diameters of the fibers in the upstream layer of fibers may demonstrate an improvement in filter media life compared to media lacking an upstream layer of fibers. In some such implementations, the upstream layer of fibers can have a mean fiber diameter of 10 microns, 12 microns, 14 microns or 15 microns. In some such implementations, the upstream layer of fibers can have a mean fiber diameter of at least 10 microns, 12 microns, 14 microns or 15 microns.

Figure 5:
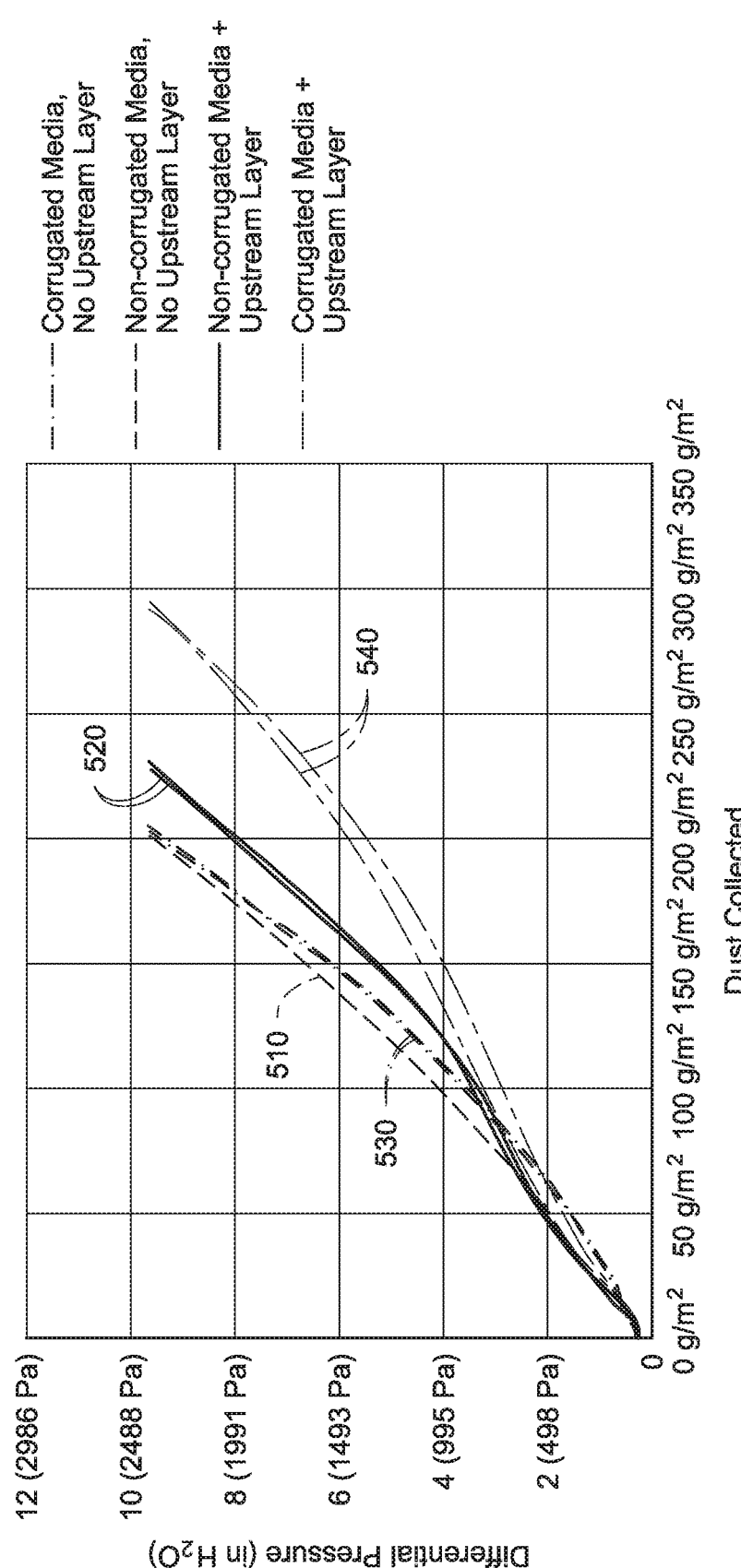
FIG. 5 is a graph showing the relationship between differential pressure and dust collected according to further filter media examples.

FIG. 5 depicts further test results measuring dust collected and differential pressure for four different example filter medias, using ISO Fine Test Dust. Each of the comparative examples incorporates a downstream layer of filter material that is a sheet of cellulose media. Each sheet of cellulose media has about 80% cellulose fibers and 20% binder by weight, and a mean fiber diameter of 15.8 microns.

A seventh comparative example 510 and an eighth comparative example 520 each have a non-corrugated sheet of cellulose media having a basis weight of about 96.1 g/m² and a capture efficiency of 25%. The seventh comparative example 510 is the sheet of cellulose media alone. The eighth comparative example 520 incorporates an upstream layer of fibers that is a scrim layer constructed of polyethylene terepthalate/polypropylene (PET/PP) bicomponent fibers having a 30 g/m² basis weight, a 7% solidity, and contains fibers having a mean fiber diameter of 38 microns.

The sheets of cellulose media in a ninth comparative example 530 and a tenth comparative example 540 each have a basis weight of 114.5 g/m² and a capture efficiency of 33%. The sheets of cellulose media of the ninth comparative example 530 and the tenth comparative example 540 are each corrugated to define an average corrugation depth of 0.58 mm. The ninth comparative example 530 is the sheet of cellulose media alone in a corrugated configuration. The tenth comparative example 540 additionally has an upstream layer of fibers abutting the upstream side of the corrugated filter material. The upstream layer of fibers in the tenth comparative example 540 is the same as the upstream layer of fibers of the eighth comparative example 520. As such, the layer of fibers in the tenth comparative example 540 has a 30 g/m² basis weight, a 7% solidity, and contains fibers having a mean fiber diameter of 38 microns.

For testing, the filter medias of each of the examples are clamped about their respective perimeters. Where the example incorporates an upstream layer of fibers, the upstream layer of fibers and the sheet of cellulose media are clamped together about their perimeters for testing, such that the upstream layer of fibers abuts the upstream side of the corrugated sheet of cellulose media.

FIG. 5 appears to demonstrate that the combination of a corrugated downstream media layer with a non-corrugated upstream fiber layer (of the tenth comparative example 540) has a lower differential pressure after loading dust at least above about 100 g/m², which advantageously impacts the life of the filter media.

Figure 6:
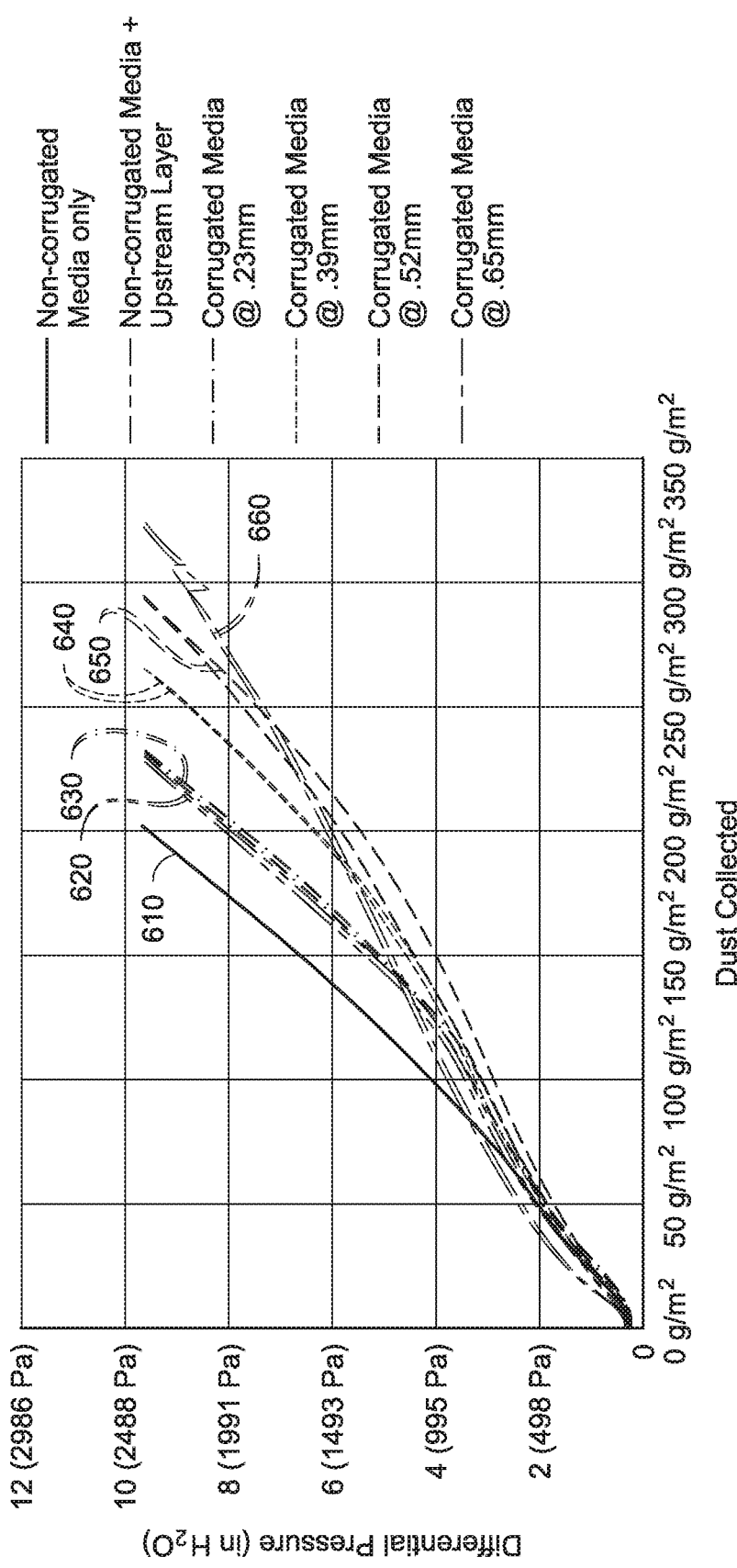
FIG. 6 is a graph showing the relationship between differential pressure and dust collected according to further filter media examples.

FIG. 6 depicts test results again measuring dust collected and differential pressure for six different example filter medias. Each example filter media has a downstream layer of filter material that is a sheet of cellulose media consistent with the seventh and eighth comparative examples, discussed above. An eleventh comparative example 610 is a non-corrugated sheet of the cellulose media alone. A twelfth comparative example 620 is a non-corrugated sheet of the cellulose media abutting an upstream layer of fibers. A thirteenth comparative example 630, fourteenth comparative example 640, fifteenth comparative example 650 and sixteenth comparative example 660 each are downstream corrugated sheets of cellulose media having an abutting upstream layer of fibers. The upstream layer of fibers in each of the relevant comparative examples in FIG. 6 is the same as the layer of fibers in the tenth comparative example 540, discussed above.

The thirteenth, fourteenth, fifteenth and sixteenth comparative examples have corrugations with different mean corrugation depths. The corrugations defined by the thirteenth comparative example 630 have a mean corrugation depth of 0.23 mm. The corrugations defined by the fourteenth comparative example 640 have a mean corrugation depth of 0.39 mm. The corrugations defined by the fifteenth comparative example 650 have a mean corrugation depth of 0.52 mm. The corrugations defined by the sixteenth comparative example 660 have a mean corrugation depth of 0.65 mm.

The data reflects that incorporating an upstream layer of fibers to a non-corrugated downstream layer of filter material (twelfth comparative example 620) results in a notable increase in filter life compared to a non-corrugated layer of filter material alone (eleventh comparative example 610). Further, in a filter media structure incorporating a non-corrugated upstream layer of fibers, a downstream filter material having a maximum corrugation depth of 0.23 mm (of the thirteenth comparative example 630) appears to be very similar (or a very slight decrease) in differential pressure compared to a filter media structure with an upstream fiber layer and a downstream filter material having no corrugations (twelfth comparative example 620) as dust is loaded on each of the filter medias.

Each of the comparative examples incorporating a corrugated downstream layer of filter material (13$^{th}$-16$^{th}$ comparative examples) has lower pressure drop than the comparative example having a non-corrugated downstream layer (twelfth comparative example 620) at least at a minimum dust loading of 150 g/m² (in the case of the sixteenth comparative example), but in some examples at a minimum dust loading of 50 g/m² or 100 g/m².

The results reflected in FIG. 6 are surprising. The sixteenth comparative example 660 appears to have a pressure drop that exceeds the pressure drop of the remainder of the comparative examples under a dust loading of about 70 g/m². The media having a maximum corrugation depth of 0.23 mm (of the thirteenth comparative example 630) performs very similarly to non-corrugated media a filter media structure with a downstream filter material having no corrugations (twelfth comparative example 620) as dust is loaded on each of the filter media.

Figure 11:
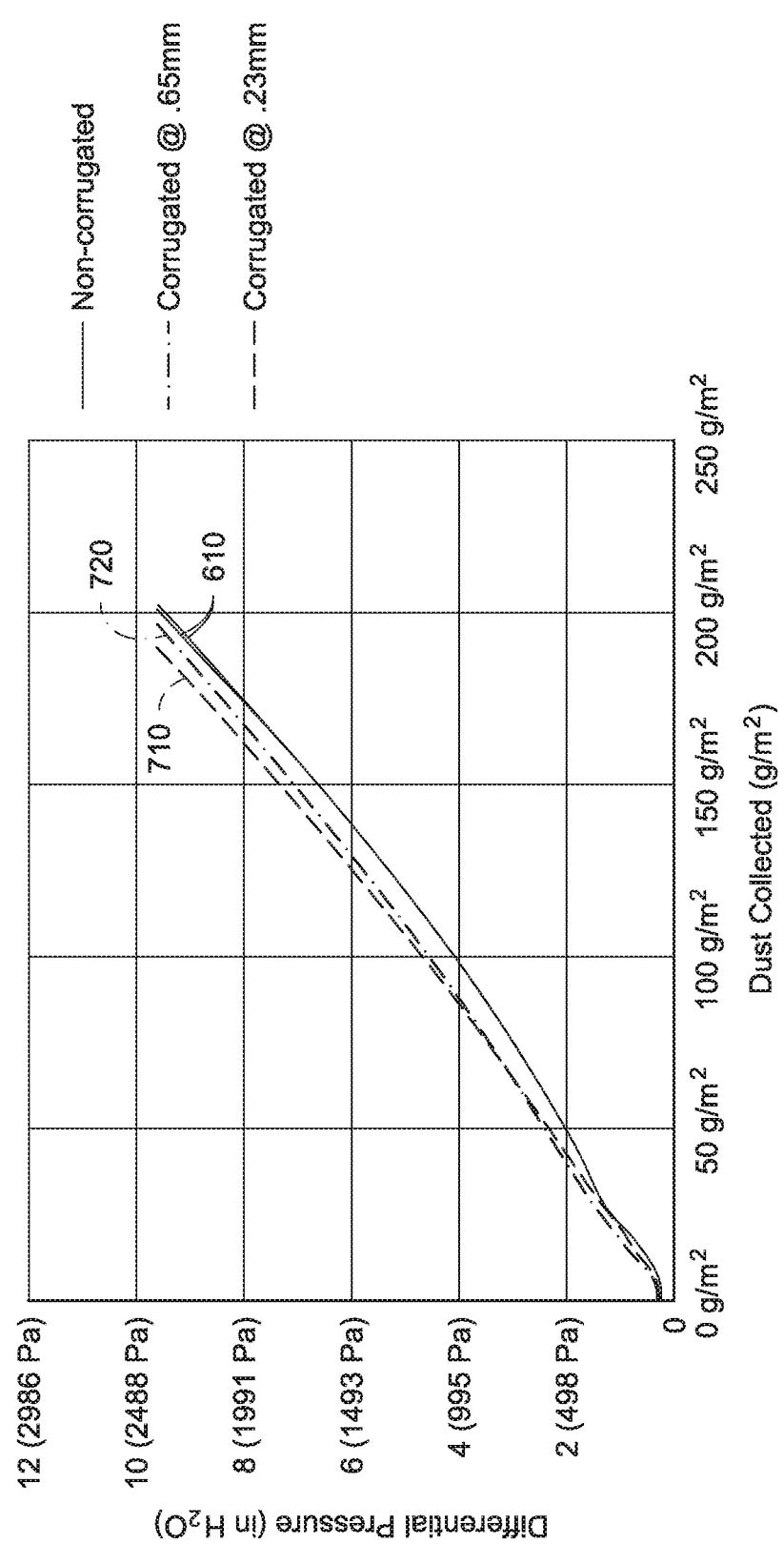
FIG. 11 is a graph showing a relationship between differential pressure and dust collected according to corrugation depth of various filter material layers.

A test was conducted to determine whether the pressure drop improvement reflected in FIG. 6 is a function of the mean corrugation depth of the downstream layer of filter material. FIG. 11 reflects data associated with the eleventh comparative example 610 of FIG. 6, which is the non-corrugated sheet of cellulose media alone (without an upstream layer of fibers), compared to two corrugated sheets of the cellulose media alone (each without an upstream layer of fibers) having different mean corrugation depths. A first cellulose media 710 has a mean corrugation depth of 0.65 mm, and a second cellulose media 720 has a mean corrugation depth of 0.23 mm. Surprisingly, FIG. 11 appears to demonstrate that, absent an upstream layer of fibers, the mean corrugation depth of the cellulose media alone does not appear to reduce the differential pressure of the media as dust is loaded onto the media. In fact, the corrugations of the first cellulose media 710 and the second cellulose media 720 appear have a slightly increased differential pressure as dust is loaded onto the media, as compared to the non-corrugated cellulose media of the eleventh comparative example 610.

Figure 7:
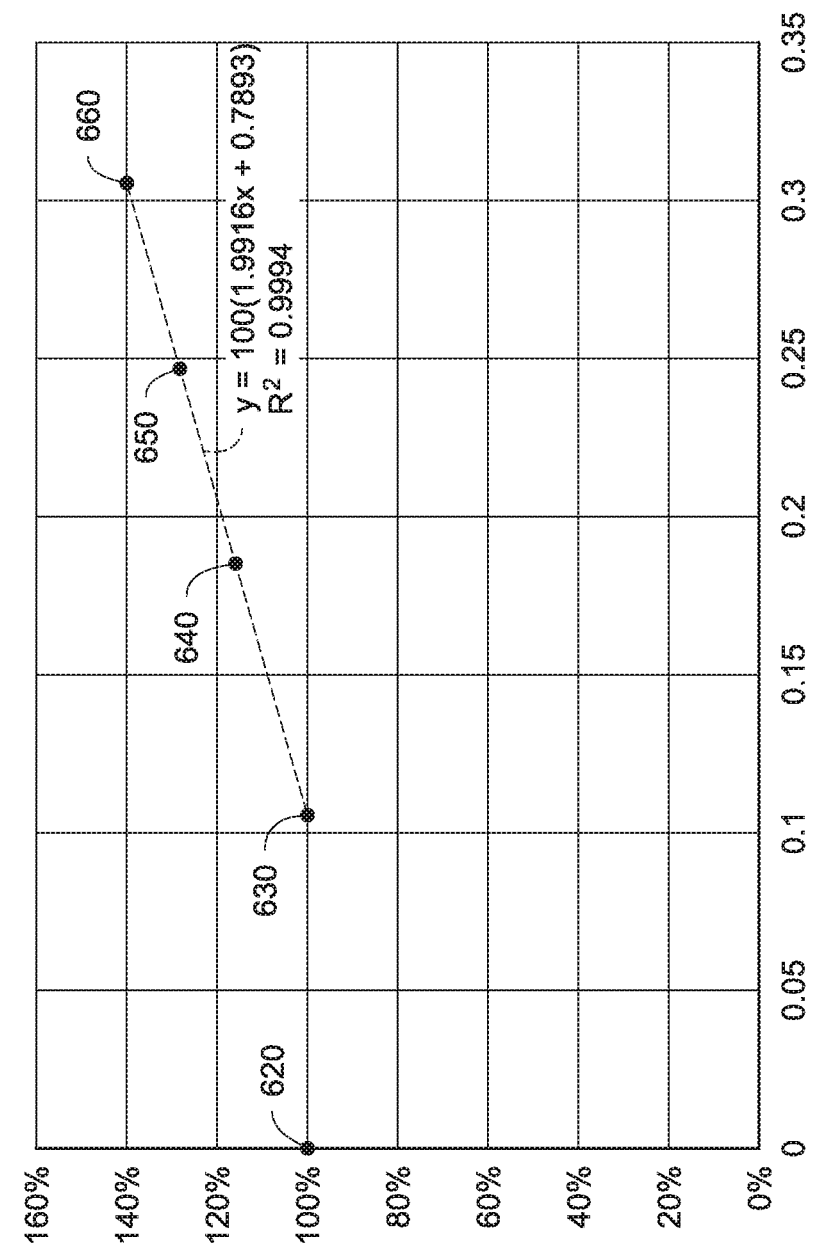
FIG. 7 is a graph showing a relationship between mean void distance between layers and improvement in dust holding capacity for various filter media examples.

On the other hand, FIG. 7 reflects the improvement in dust holding capacity of the twelfth 620, thirteenth 630, fourteenth 640, fifteenth 650 and sixteenth 660 comparative examples (discussed above with reference to FIG. 6) according to the mean void distance between the upstream layer of fibers and the downstream layer of filter material. The dust holding capacity is determined at a 9.6 inch-H$_2$O (2388 Pa) pressure drop, a 10.5 ft/min (5.33 cm/sec) flow rate with ISO Fine Test Dust. The improvement in dust holding capacity is a percentage based on the dust holding capacity of the twelfth comparative example 620, which has a mean void distance of zero between the upstream layer of fibers and the downstream layer of filter material because the downstream layer of filter material is non-corrugated. Each of the thirteenth 630, fourteenth 640, fifteenth 650 and sixteenth 660 comparative examples had a mean void distance between the upstream layer of fibers and the downstream layer of filter material that was calculated as described above in the discussion of calculating D$_{mean}$ in FIG. 1.

The graph of FIG. 7 reflects that, at the above-described test parameters, the dust holding capacity improves almost linearly with an increase in the mean void distance between the upstream layer of fibers and the downstream layer of filter material when the mean void distance is above 0.11 mm. When the upstream layer of fibers and/or the downstream layer of filter material has alternate configurations (such as being constructed of alternate types of fibers and combinations of fibers) the minimum mean void distance can be different than 0.11 mm. The "minimum mean void distance" is defined as the mean void distance between the layers above which the dust holding capacity of the media exhibits improvement compared to a mean void distance between the layers of about zero.

Figure 8:
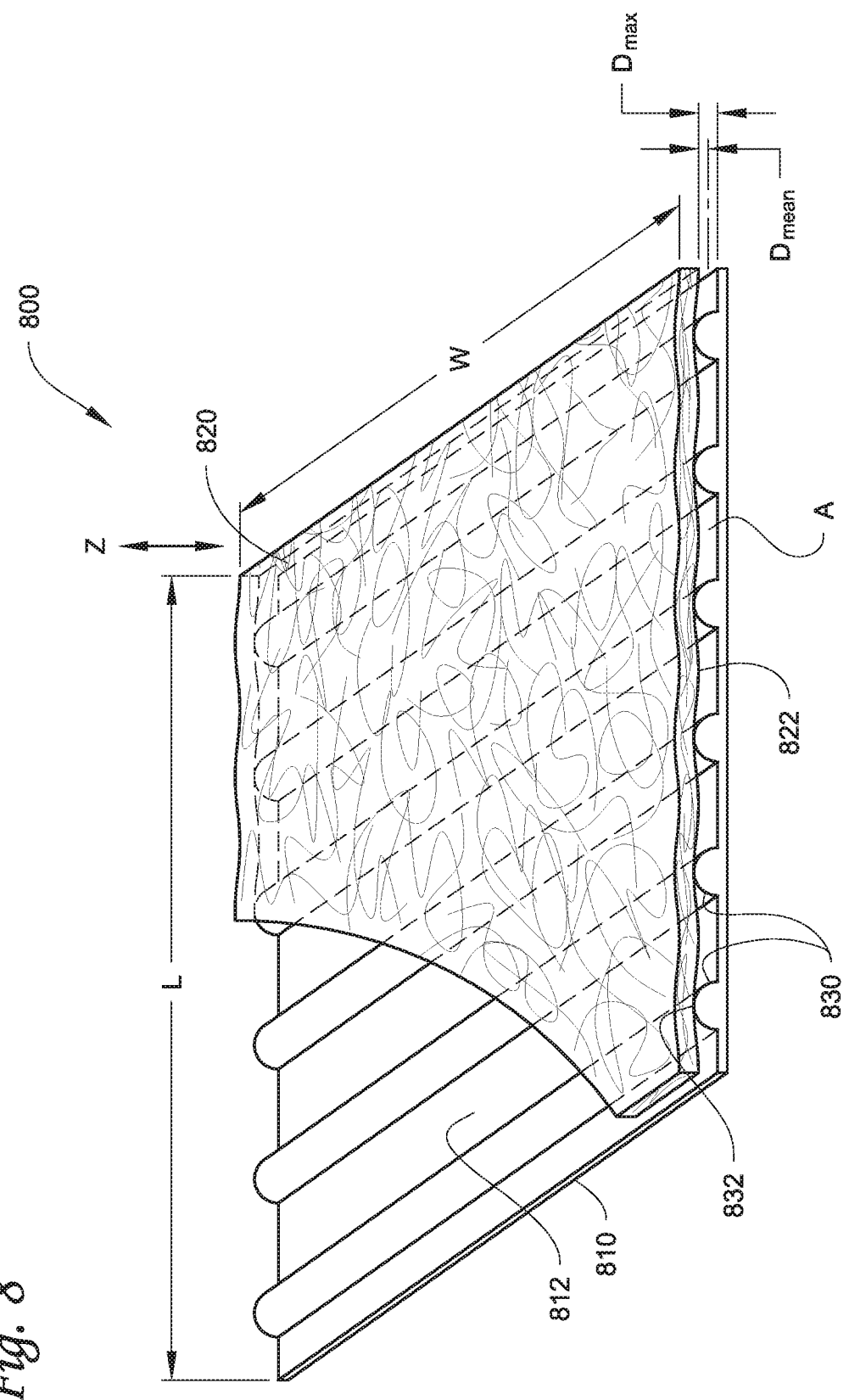
FIG. 8 is another example filter media consistent with the technology disclosed herein.

FIG. 8 depicts another example filter media 800 consistent with the technology disclosed herein. Similar to example embodiments depicted in FIGS. 1 and 2, the filter media 800 has a downstream layer of filter material 810 abutting an upstream layer of fibers 820. The upstream layer of fibers 820 can have a support layer similar to that described above with reference to FIG. 2. The upstream layer of fibers 820 can be in direct contact with a spacing structure 830 on the downstream layer of filter material 810. The example filter media 800 and corresponding components can have the same components, parameters, and properties as other examples described herein, except where explicitly contradictory.

While the downstream layer of filter material 810 is non-corrugated, the currently-depicted example filter media 800 demonstrates another structure for achieving a particular mean void distance D$_{mean}$ between the upstream layer of fibers 820 and the downstream layer of filter material 810 in the z-direction, such as a mean void distance D$_{mean}$ greater than 0.11 mm and less than 2.0 mm, 1.0 mm or 0.7 mm. In particular, the spacing structure 830 on the downstream layer of filter material 810 protrudes in the z-direction towards the upstream layer of fibers 820 and defines a peak. The upstream layer of fibers 820 extends across the peaks defined by the spacing structure 830. In the current example, the spacing structure 830 is a series of spaced elongate ribs that extend along the width W of the filter media 800 and are spaced across the length L of the filter media 800 at a particular increment.

The spacing structure 830 can be defined by the downstream layer of filter material 810 itself. For example, the spacing structure 830 can be formed by shaping the downstream layer of filter material 810 such as through embossing. In some other embodiments, the spacing structure 830 can be a separate component that is deposited on the upstream side 812 of the downstream layer of filter material 810 or the downstream surface 822 of the upstream layer of fibers 820 before the upstream layer of fibers 820 is deposited on the upstream side 812 of the downstream layer of filter material 810. As examples, the spacing structure 830 can be a hot melt polymer, epoxy resin, or adhesive that is deposited in an uncured state and then allowed to cure. As another example, the spacing structure can be a pre-formed structural component that is coupled to one or both of the upstream layer of fibers 820 and the downstream layer of filter material 810.

Because the spacing between the layers of the filter media 800 is generally uniform along the width W direction, the mean void distance D$_{mean}$ between the upstream layer of fibers 820 and the downstream layer of filter material 810 will be about equal to the mean void distance D$_{mean}$ in the length L direction. The mean void distance D$_{mean}$ in the length L direction can be calculated, for example, by calculating a total cross-sectional area A (in a plane extending in the length L and z-directions) of the void between the layers and dividing the cross-sectional area A by the length L, similar to as discussed above with reference to FIG. 1 downstream layer of filter material. The mean void distance D$_{mean}$ will generally be less than a maximum void distance D$_{max}$ between the layers, where the maximum void distance D$_{max}$ between the layers can be calculated based on the z-direction void distance between a peak 832 of the spacing structure 830 and the upstream side 812 of the downstream layer of filter material 810.

The maximum void distance D$_{max}$ can be calculated as an average similar to the mean corrugation depth, as discussed above with reference to FIG. 1. At locations where the spacing structure 830 makes contact with the downstream layer of filter material 810 and the upstream layer of fibers 820, the void distance between the layers 810, 820 is zero because there is no void between the layers 810, 820 at the spacing structure 830. In some embodiments the average maximum void distance D$_{max}$ is less than 4.0 mm. In some embodiments the average maximum void distance D$_{max}$ is less than 2.0 mm. In some embodiments the average maximum void distance D$_{max}$ is less than 1.5 mm.

Figure 9:
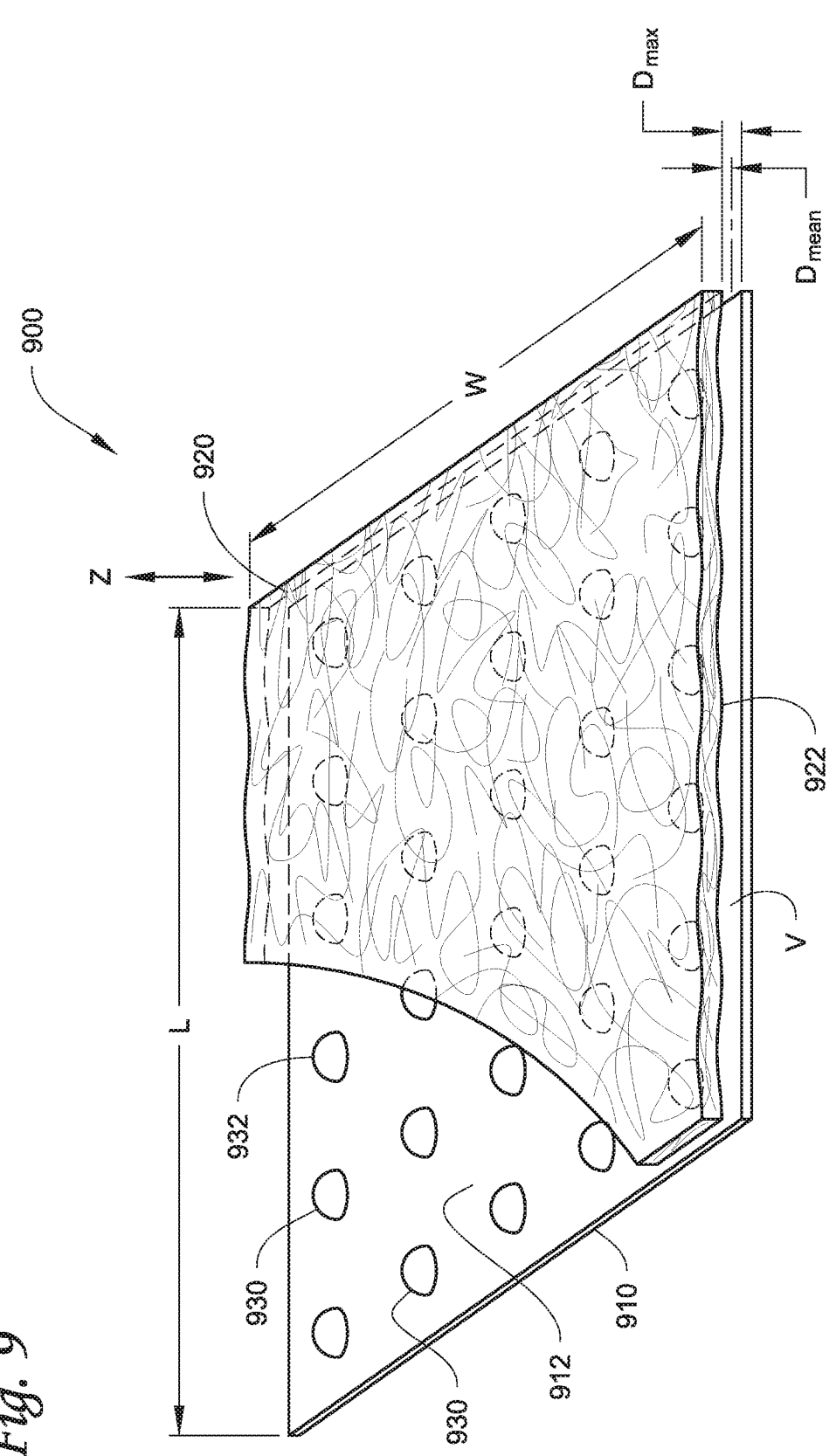
FIG. 9 is yet another example filter media consistent with the technology disclosed herein.

FIG. 9 depicts another example filter media 900 consistent with the technology disclosed herein. This example filter media 900 is generally consistent with the example filter media described above with reference to FIG. 8 and can have the same components, parameters, and properties as other examples described herein, except where explicitly contradictory. The filter media 900 has a downstream layer of filter material 910 abutting a spacing structure 930 on an upstream layer of fibers 920. The upstream layer of fibers 920 can have a support layer or not.

While the downstream layer of filter material 910 is non-corrugated, the currently-depicted example filter media 900 demonstrates another structure for achieving a particular mean void distance D$_{mean}$ between the upstream layer of fibers 920 and the downstream layer of filter material 910, such as a mean void distance D$_{mean}$ greater than 0.11 mm and less than 2.0 mm, 1.0 mm or 0.7 mm. In particular, the spacing structure 930 on the downstream layer of filter material 910 protrudes in the z-direction towards the upstream layer of fibers 920. In the current example, the spacing structure 930 has a series of discrete bulges that are spaced across the width W and the length L of the filter media 900. The upstream layer of fibers 920 extends across peaks defined by the spacing structure 930. Similar to the example of FIG. 8, the spacing structure 930 can be defined by the downstream layer of filter material 910 itself or the spacing structure 930 can be a separate component that is deposited on the upstream side 912 of the downstream layer of filter material 910 or the downstream surface 922 of the upstream layer of fibers 920, which is described above.

Because the spacing between the layers of the filter media 900 is not uniform along the width W or length L directions, the mean void distance $D_{mean}$ is calculated based on measurements in both directions. In particular, the mean void distance $D_{mean}$ can be calculated by calculating the total volume V between the upstream layer of fibers 920 and the downstream layer of filter material 910 and dividing the total volume V by the area of the sample (which is the length L multiplied by the width W). The mean void distance $D_{mean}$ will generally be less than a maximum void distance $D_{max}$ between the layers, where the maximum void distance $D_{max}$ between the layers can be calculated based on the z-direction void distance between a peak 932 of the spacing structure and the upstream side 912 of the downstream layer of filter material 910. The maximum void distance $D_{max}$ can be calculated as an average at a plurality of sample locations across the filter media 900 in a manner similar to the mean corrugation depth as discussed above with reference to FIG. 1. In some embodiments the average maximum void distance $D_{max}$ is less than 4.0 mm. In some embodiments the average maximum void distance $D_{max}$ is less than 2.0 mm. In some embodiments the average maximum void distance $D_{max}$ is less than 1.5 mm.

Figure 12:
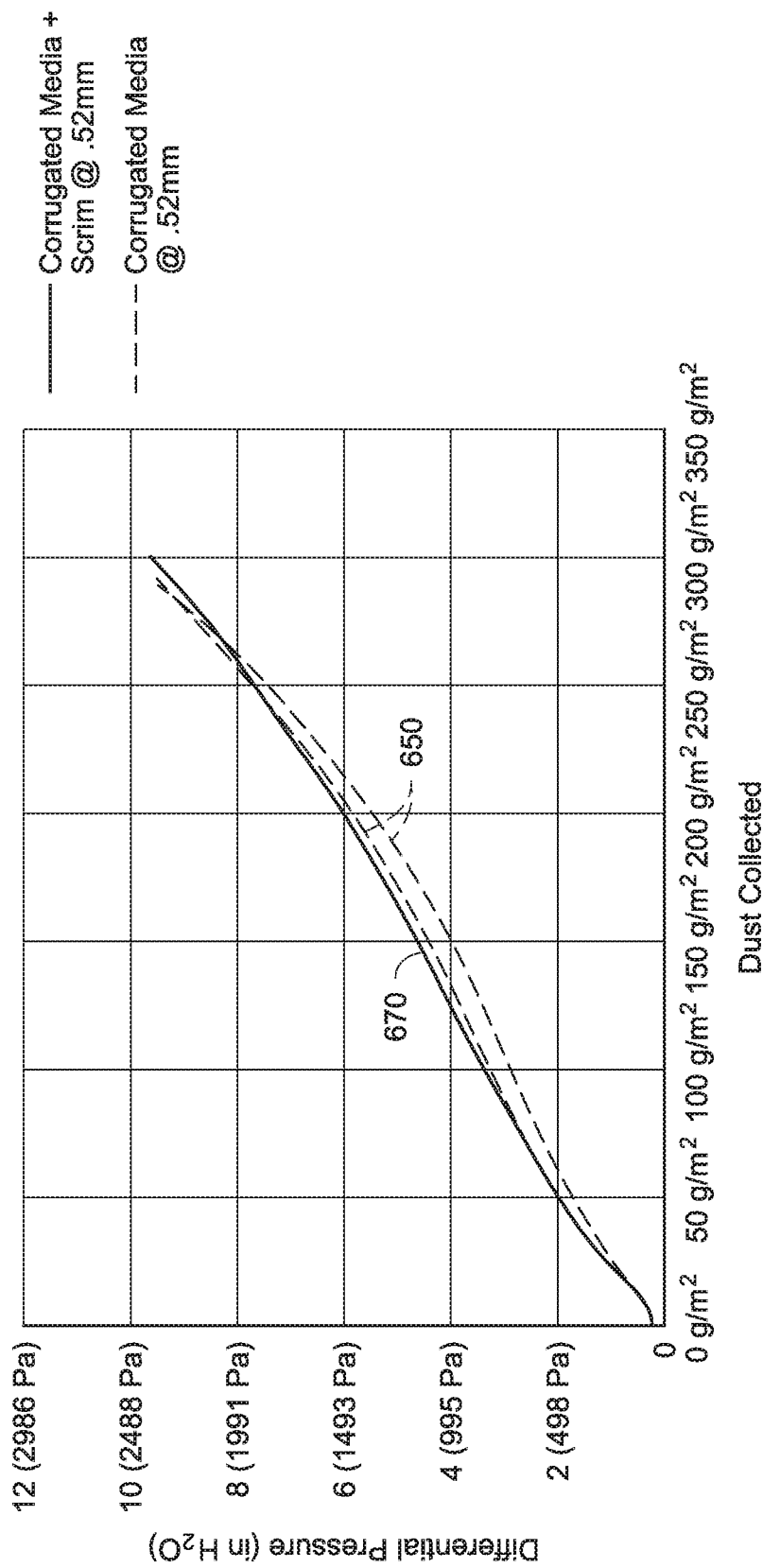
FIG. 12 is a graph showing a relationship between differential pressure and dust collected according to various filter medias.
Figure 13:
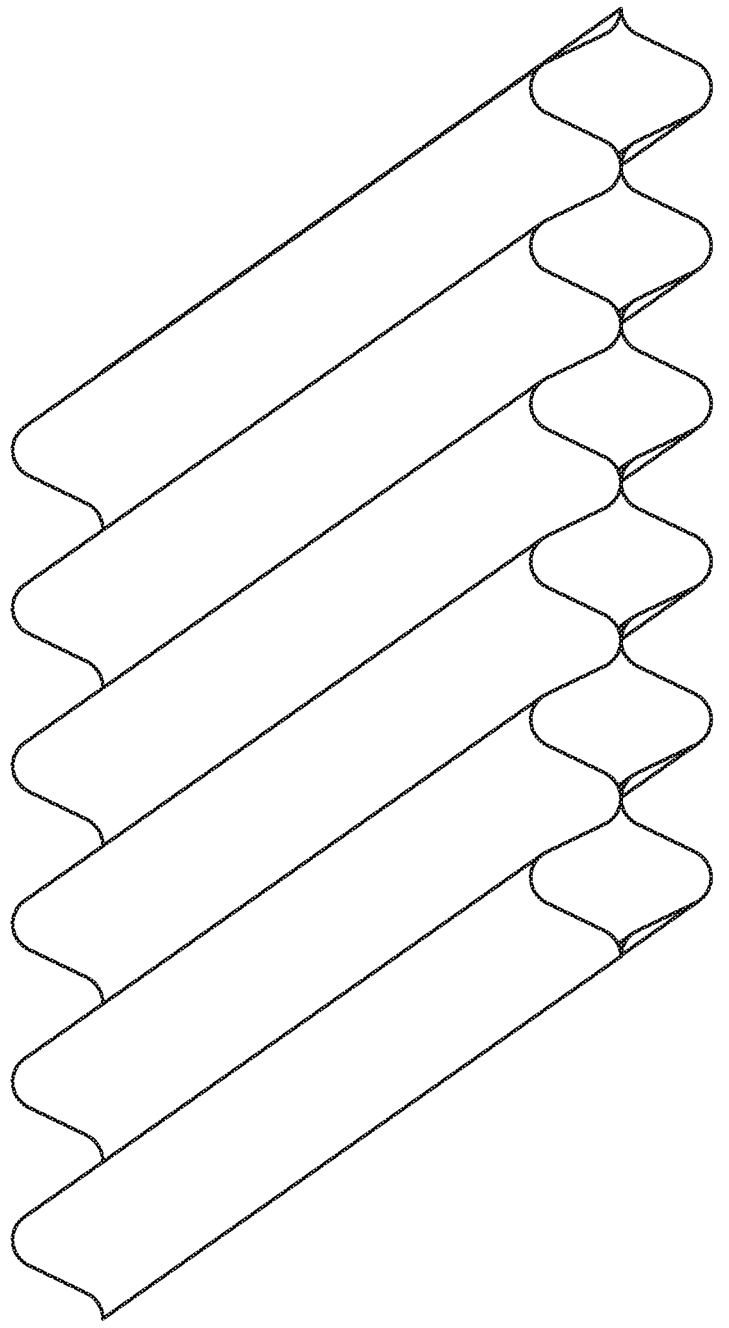
FIG. 13 depicts an example filter media structure.

FIG. 12 reflects test results comparing the differential pressure of the fifteenth comparative example 650 to a seventeenth comparative example 670, where the fifteenth comparative example 650 has a downstream sheet of cellulose media corrugated to a mean depth of 0.52 mm and an abutting, substantially planar, upstream layer of fibers that is a scrim layer constructed of PET/PP bicomponent fibers having a 30 g/m² basis weight, a 7% solidity, and contains fibers having a mean fiber diameter of 38 microns. The seventeenth comparative example 670 uses the same corrugated downstream sheet of cellulose media and the same upstream layer of fibers as the fifteenth comparative example, except the upstream layer of fibers is corrugated to also have a mean corrugation depth of 0.52 mm. The upstream layer of fibers is positioned on the downstream layer of cellulose media such that the peaks of the corrugations defined by the cellulose media abut the valleys of the corrugations defined by the upstream layer of fibers, similar to the structure depicted in FIG. 13. For testing, the corrugated upstream layer of fibers is clamped to the downstream sheet of cellulose media about their respective perimeters. Such a configuration increases the mean void distance between the upstream layer of fibers and the downstream layer of filter material.

The seventeenth comparative example 670 was tested and compared to two sets of data associated with the fifteenth comparative example 650. FIG. 12 suggests that there is not a notable difference in differential pressure across the two medias as dust is loaded on each media. In particular, there does not appear to be an advantage associated with corrugating the upstream layer of fibers.

Figure 14:
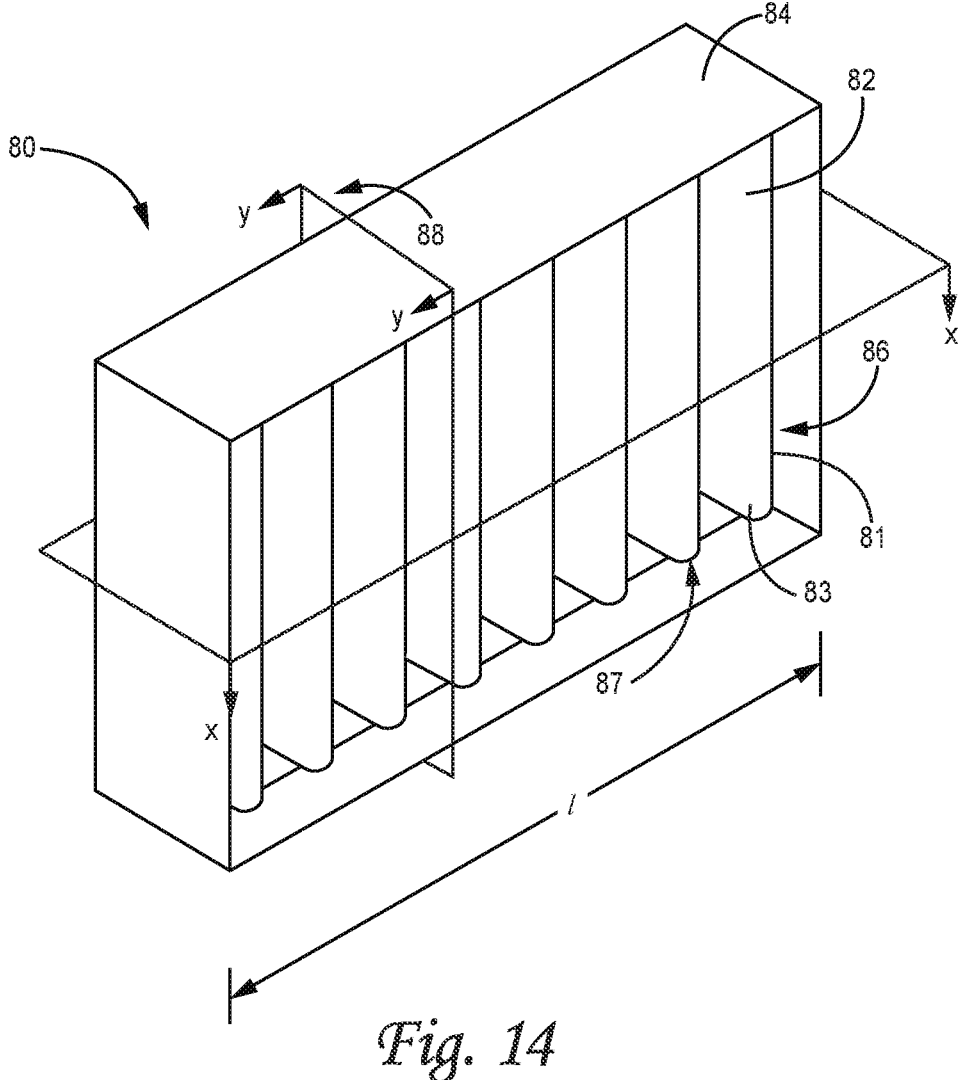
FIG. 14 depicts an example filter element incorporating filter media described herein.

FIG. 14 depicts an example filter element 80 incorporating filter media 82 described herein. In this example the filter element 80 is a panel filter element. The filter element 80 will generally be constructed of filter media 82 that is in a pleated configuration, meaning that the filter media 82 has a plurality of pleats 83 extending between a first set of pleat folds 81 and a second set of pleat folds (not currently visible). The first set of pleat folds 81 form an upstream face on an upstream side 86 of the filter element 80, and the second set of pleat folds form a downstream face (not visible in the current figure) on a downstream side 88 of the filter element 80. The filter media 82 is positioned between the upstream side 86 and the downstream side 88 of the filter element 80.

The filter element 80 has a frame component 84 that is secured to a perimeter region 87 of the filter media 82. The frame component 84 extends around the filter media 82. In a variety of embodiments, the perimeter region 87 of the filter media 82 is secured to the frame component 84 with epoxy or other adhesive material. In embodiments, to construct the filter element 80, the frame component 84 is overmolded to the perimeter region 87 of the filter media 82. In some such embodiments, a mold is positioned around the perimeter region 87 of the filter media 82 to contain the perimeter region 87. The mold can generally exclude the filter media region central to the perimeter region 87. The frame component 84 can be formed from a material that is injected into the mold to surround the and then allowed to cure to secure the perimeter region 87 to the frame component 84. In such embodiments, the mold can be detached from the filter media 82 once the frame component 84 has cured to have sufficient structural stability.

The number of pleats 83 in the filter element 80 can be described in terms of linear pleat density. In a panel filter element 80 the linear pleat density is the total number of pleats 83 in the filter element 80 divided by the length l of the filter media 82 extending across the pleat folds 81. In this way the linear pleat density describes the density of pleats packed in the filter element 80. The linear pleat density can be described in pleats per inch (PPI). In a variety of embodiments, the filter elements described herein have a linear pleat density of greater than 1 PPI. In a variety of embodiments, the filter elements described herein have a linear pleat density of greater than 4 PPI. The filter elements can have a linear pleat density of greater than 8 PPI. In some embodiments, the filter elements described herein have a linear pleat density of less than 16 PPI. In some embodiments, the filter elements described herein have a linear pleat density ranging from 10 PPI to 14 PPI.

Figure 15:
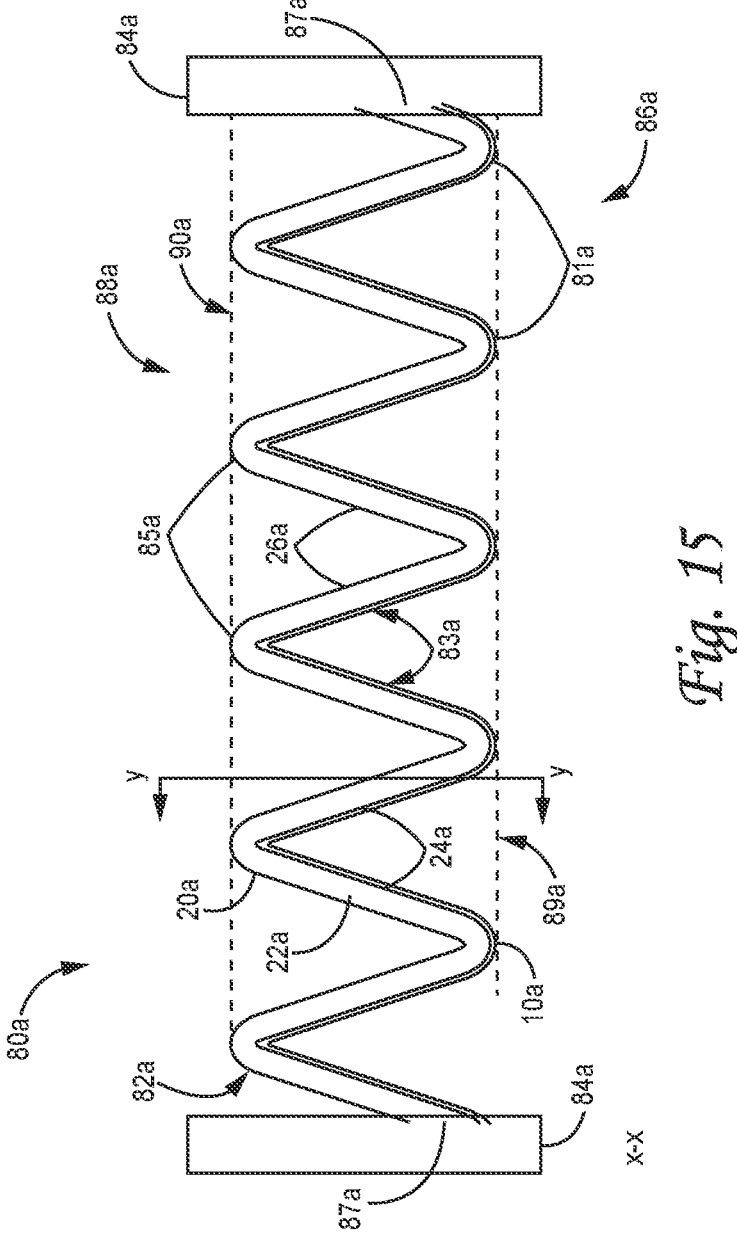
FIG. 15 depicts a cross-section through a first plane of a first example filter element consistent with FIG. 14.
Figure 16:
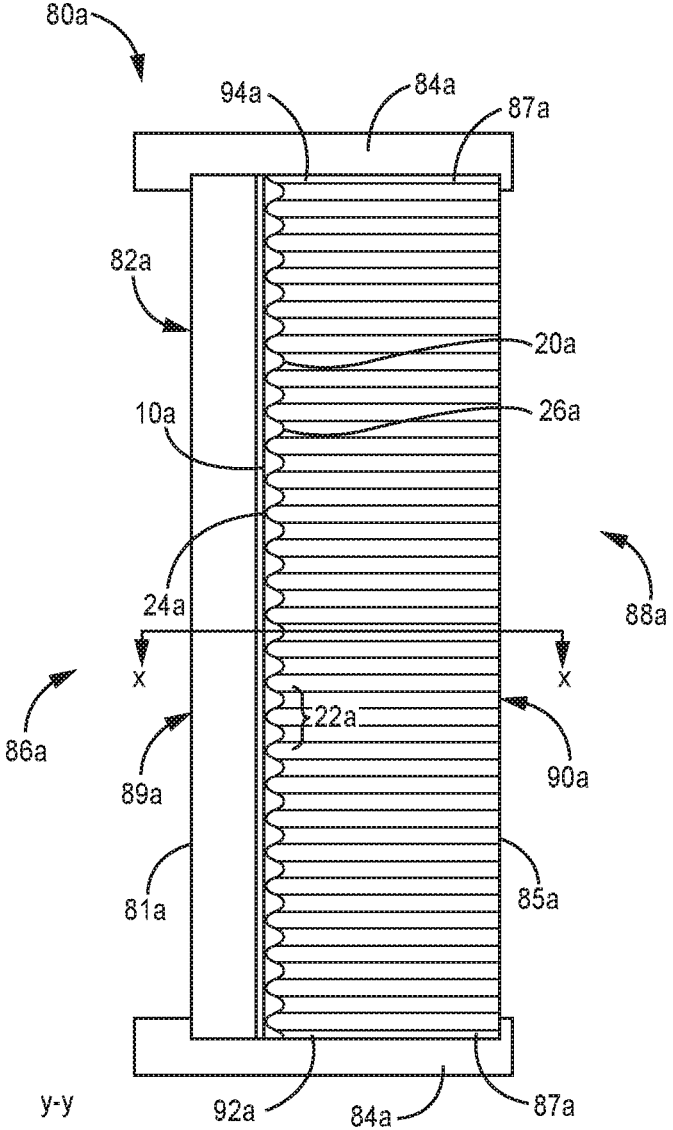
FIG. 16 depicts a cross-section through a second plane of the first example filter element consistent with FIGS. 14 and 15.

The filter element 80 of FIG. 14 can be consistent with any of the filter media configurations disclosed herein. For example, FIG. 15 depicts a first cross-section of a first example filter element consistent with FIG. 14 through cutting plane x-x, and FIG. 16 depicts a second cross-section of the first example filter element through cutting plane y-y. The filter element 80a is constructed of filter media 82a and a frame component 84a. The filter media 82a has a perimeter region 87a. The frame component 84a is secured to the perimeter region 87a of the filter media 82a, as discussed above.

The filter media 82a is in a pleated configuration. The filter media 82a has a plurality of pleats 83a extending between a first set of pleat folds 81a and a second set of pleat folds 85a. The first set of pleat folds 81a form an upstream face 89a on an upstream side 86a of the filter element 80a, and the second set of pleat folds 85a form a downstream face 90a on a downstream side 88a of the filter element 80. The filter media 82a is positioned between the upstream side 86a and the downstream side 88a of the filter element 80a.

In the current example, the filter media 82a is consistent with filter medias described above with reference to FIGS. 1 and 2. There is a downstream layer of filter material 20a and an upstream layer of fibers 10a, which are each consistent with the discussions elsewhere herein. A spacing structure 22a is defined between the downstream layer of filter material 20a and the upstream layer of fibers 10a. The spacing structure 22a defines a mean void distance between the upstream layer of fibers 10a and the downstream layer of filter material 20a. The mean void distance can be consistent with those described above.

In the current example, the spacing structure 22a is formed by corrugations (visible in FIG. 16) defined by the downstream layer of filter material 20a. In particular, a plurality of peaks 24a and valleys 26a extend across each pleat 83a from the first pleat fold 81a to the second pleat fold 85a. The plurality of peaks 24a and valleys 26a alternate from a first side edge 92a of the filter media 20a to the opposite side edge 94a of the filter media 20a. The first side edge 92a and the opposite side edge 94a of the filter media 82a are elongate edges of the filter media 20a that are perpendicular to the pleat folds 81a, 85a. The upstream layer of fibers 10a extends across the peaks 24a of the downstream layer of filter material 20a, as has been discussed in detail above. The upstream layer of fibers 10a is substantially planar in a region between the first set of pleat folds 81a and the second set of pleat folds 85a. In the current example, the corrugation peaks 24a and valleys 26a are perpendicular to the first set of pleat folds 81a and the second set of pleat folds 85a. In some alternate embodiments, the corrugation peaks 24a and valleys 26a are parallel to the pleat folds 81a, 85a. In some further embodiments, the corrugation peaks 24a and valleys 26a are between perpendicular and parallel to the first set of pleat folds 81a and the second set of pleat folds 85a.

It is noted that, for purposes of the present disclosure, the mean void distance of the filter media 82a in a filter element 80a is the mean void distance of a non-pleated flat sheet of the filter media 82a. In various embodiments, the void distance between the upstream layer of fibers 10a and the downstream layer of filter material 20a may deviate around the pleat folds 81a, 85a compared to a central region of the pleats 83a that lies between the pleat folds 81a, 85a. For example, pleating operations may compress the spacing structure 22a at the pleat folds 81a, 85a such that the void distance is relatively low compared to the central region of the pleats 83a between the pleat folds 81a, 85a.

In various embodiments, the filter element 80a has at least 5 corrugation peaks 24a per pleat 83a. In some embodiments the filter element 80a has at least 15 corrugation peaks 24a per pleat 83a, or at least 30 corrugation peaks 24a per pleat 83a. The filter element 80a can have less than 600 corrugation peaks 24a per pleat 83a, less than 300 corrugation peaks 24a per pleat 83a, or less than 100 corrugation peaks 24a per pleat 83a. The corrugation peaks per pleat of a filter element 80a is the number of corrugation peaks across the width of the pleat, where the width of the pleat is defined between the first side edge 94a and the second side edge 94b for each pleat 83a in the filter element 80a. In various embodiments, there are 15 to 200 corrugation peaks 24a per pleat 83a.

The number of corrugation peaks 24a per pleat 83a generally depends on the width of the pleats in the filter element and density of the corrugations across the filter media. In various embodiments, the filter media has 2-10 corrugations per inch. In some embodiments the filter media has 4-6 corrugations per inch. In some embodiments the filter media has about 5 corrugations per inch.

Figure 17:
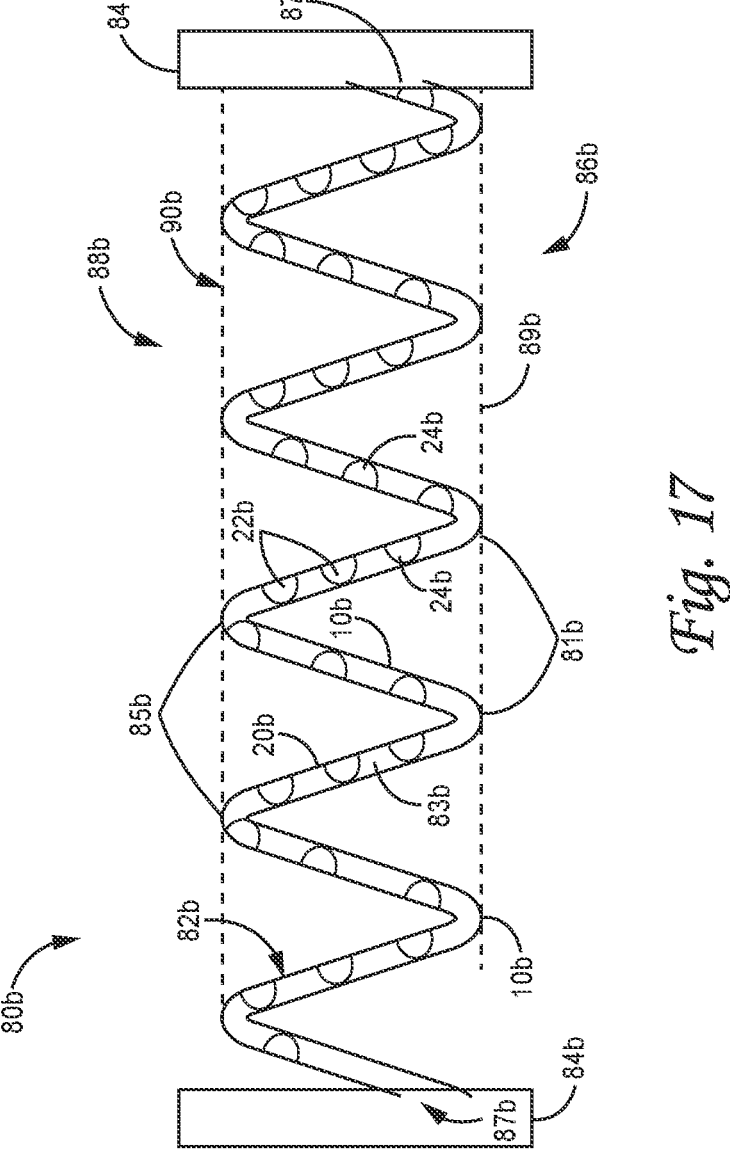
FIG. 17 depicts a cross-section through a first plane of a second example filter element consistent with FIG. 14.

The filter media of the filter element of FIG. 14 can be consistent with other types of filter media discussed elsewhere herein. FIG. 17 depicts a second example cross-section of the example filter element 80b of FIG. 14, where the filter media 82b can be consistent with, for example, filter medias discussed above with reference to FIGS. 8 and 9, for example. The filter element 80b is constructed of filter media 82b and a frame component 84b. The filter media 82b has a perimeter region 87b. The frame component 84b is secured to the perimeter region 87b of the filter media 82b, as discussed above.

The filter media 82b is in a pleated configuration. The filter media 82b has a plurality of pleats 83b extending between a first set of pleat folds 81b and a second set of pleat folds 85b. The first set of pleat folds 81b form an upstream face 89b on an upstream side 86b of the filter element 80b, and the second set of pleat folds 85b form a downstream face 90b on a downstream side 88b of the filter element 80b. The filter media 82b is positioned between the upstream side 86b and the downstream side 88b of the filter element 80b.

In the current example, the filter media 82b is consistent with filter medias described above with reference to FIGS. 8 and 9. The filter media 82b has a downstream layer of filter material 20b and an upstream layer of fibers 10b, which are each consistent with the discussions elsewhere herein. A spacing structure 22b is defined between the downstream layer of filter material 20b and the upstream layer of fibers 10b. The spacing structure 22b defines a mean void distance between the upstream layer of fibers 10b and the downstream layer of filter material 20b, as has been discussed in detail elsewhere herein. The upstream layer of fibers 10b is substantially planar in a region between the first set of pleat folds 81b and the second set of pleat folds 85b.

In the current example, the spacing structure 22b can be consistent with elongate ribs, such as those discussed above with reference to FIG. 8, or bulges, such as those described above with reference to FIG. 9. The upstream layer of fibers 10a extends across peaks 24a of the spacing structure 22b.

Figure 10:
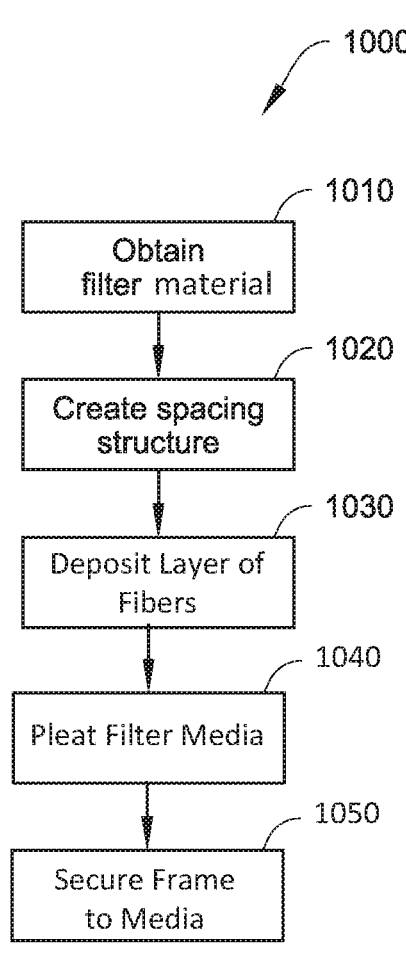
FIG. 10 is an example flow chart consistent with the technology disclosed herein.

Now methods associated with construction filter elements will be discussed. FIG. 10 depicts a method of constructing a filter element 1000 consistent with embodiments of the technology disclosed herein. Filter material is generally obtained 1010, a spacing structure is created 1020, a layer of fibers are deposited on the filter material 1030 to form filter media, the filter media is pleated 1040, and the media is secured to a frame component 1050.

The filter material can be consistent with filter materials described herein. Generally, the filter material has a capture efficiency of at least 10% and, in some embodiments the filter material has a capture efficiency from 20% to 40%. The filter material generally incorporates fibers and can have a mean fiber diameter from 4 to 30 microns, in some embodiments. The filter material can contain cellulose fibers, synthetic fibers, and the like. In some embodiments the filter material is constructed by wet laying fibers, such as cellulose fibers, where a slurry formed with the fibers is dried to create the filter material.

The spacing structure is generally created 1020 relative to the filter material, and the spacing structure can be created 1020 through a variety of approaches. For example, the filter material can be corrugated. In such an example, a length of filter material is passed through corrugating equipment that creates the alternating peaks and valleys across the length of the filter material (such as depicted in FIGS. 1 and 2). The corrugations can be consisted with corrugations discussed throughout this document. In another example, a spacing structure is created 1020 by depositing a hot melt polymer on an upstream surface of the filter material. In yet another example, a spacing structure is created 1020 by coupling a pre-formed structure onto the filter material.

The layer of fibers is deposited 1030 on the spacing structure to form the filter media. Particularly, the layer of fibers is deposited 1030 on an upstream side of the filter material, and more particularly, across the spacing structure on the filter material. In embodiments where the filter material is corrugated, the layer of fibers is deposited 1030 to extend across the peaks of the corrugations of the filter material. The layer of fibers can be deposited 1030 on the spacing structure by pre-forming the layer of fibers, and then placing the pre-formed layer of fibers across the spacing structure. For example, the layer of fibers can be formed by a wet-laying process, and the wet-laid layer of fibers can be deposited 1030 across the spacing structure. In some alternate embodiments, as has been mentioned above, the spacing structure can be deposited on a downstream surface of the upstream layer of fibers. In such embodiments, the upstream layer of fibers having the spacing structure can be coupled to the downstream layer of filter material.

In some embodiments the fibers are constructed using a co-extrusion process to create a variety of configurations, such as bi-component fibers having a sheath/core structure or a side-by-side structure. In such embodiments the fibers can be cut as staple fibers and wet-laid onto a support layer to form the layer of fibers.

Alternatively, the act of depositing the fibers 1030 on the spacing structure can form the layer of fibers. In some embodiments, the layer of fibers is deposited 1030 by electrospinning the fibers onto the spacing structure. In some embodiments, the layer of fibers is deposited 1030 by melt-blowing polymeric fibers onto the spacing structure. In some embodiments, the layer of fibers is deposited 1030 by using spunbond technology to deposit polymeric fibers onto the spacing structure. In various embodiments, the layer of fibers self-adhere to the spacing structure of the filter material. The layer of fibers is deposited 1030 to define a generally planar configuration, although not necessarily perfectly planar, as discussed above.

In various embodiments, the layer of fibers is deposited 1030 directly onto the spacing structure of the filter material. In some other embodiments, the layer of fibers is deposited 1030 on a support layer and the support layer is coupled to the spacing structure of the filter material (to achieve a configuration similar to that depicted in FIG. 2). In some embodiments, the support layer is not coupled to the spacing structure of the filter material and is positioned to abut the spacing structure of the filter material. The support layer can be similar to that described above with reference to FIG. 2.

As discussed above, the fibers in the layer of fibers have a mean fiber diameter of at least 10 microns and in ranges described in more detail above. In some embodiments, a plurality of the fibers in the layer of fibers are crimped. Also, as discussed above, in some embodiments the layer of fibers is not self-supporting.

The filter media is then pleated 1040. To pleat the filter media 1040 the filter media is folded to define a first set of pleat folds and a second set of pleat folds. In various embodiments the filter media is pleated with the use of a pleater such as a blade pleater, although other equipment can be used.

The filter media is secured to a frame component 1050 to form a filter element. As discussed above in the discussion of FIG. 14, the frame component can be a separate component that is secured to the filter media 1050 with an adhesive material. In some embodiments the frame component is secured to the filter media 1050 by overmolding the frame component to the filter media. Other approaches can also be used.

Exemplary Embodiments

Embodiment 1. A filter element comprising:
  filter media in a pleated configuration having a first set of pleat folds forming an upstream face and a second set of pleat folds forming a downstream face, the filter media having a perimeter region, the filter media comprising:
    a. a downstream layer of filter material in a corrugated configuration defining peaks and valleys; and
    b. an upstream layer of fibers extending across the peaks of the downstream layer of filter material, wherein a void space is defined between the downstream layer of filter material and the upstream layer of fibers and the upstream layer of fibers has less than 10% solidity; and
  a frame component secured to the perimeter region of the filter media.
Embodiment 2. The filter element of any one of embodiments 1 and 3-21, wherein
  the downstream layer of filter material has a capture efficiency of at least 10%
Embodiment 3. The filter element of any one of embodiments 1-2 and 4-21,
  wherein the downstream layer of filter material has a mean corrugation depth of less than 2.0 mm.
Embodiment 4. The filter element of any one of embodiments 1-3 and 5-21,
  wherein the upstream layer of fibers has a mean fiber diameter of at least 10 microns.
Embodiment 5. The filter element of any one of embodiments 1-4 and 6-21,
  wherein a plurality of fibers in the upstream layer of fibers are crimped.
Embodiment 6. The filter element of any one of embodiments 1-5 and 7-21,
  wherein the downstream layer of filter material has a capture efficiency from 20% to 40%.
Embodiment 7. The filter element of any one of embodiments 1-6 and 8-21,
  wherein the downstream layer of filter material comprises cellulose fibers.
Embodiment 8. The filter element of any one of embodiments 1-7 and 9-21,
  wherein the cellulose fibers comprise wet-laid cellulose fibers.
Embodiment 9. The filter element of any one of embodiments 1-8 and 10-21,
  wherein the downstream layer of filter material comprises synthetic fibers.
Embodiment 10. The filter element of any one of embodiments 1-9 and 11-21,
  wherein the upstream layer of fibers comprises polymeric fibers.
Embodiment 11. The filter element of any one of embodiments 1-10 and 12-21,
  wherein the downstream layer of filter material comprises fibers having a mean fiber diameter from 4 to 30 microns.
Embodiment 12. The filter element of any one of embodiments 1-11 and 13-21, wherein the upstream layer of fibers is not self-supporting.

Embodiment 13. The filter element of any one of embodiments 1-12 and 14-21, wherein the upstream layer of fibers is an upstream-most layer and the upstream layer of fibers is in direct contact with the downstream layer of filter material.

Embodiment 14. The filter element of any one of embodiments 1-13 and 15-21, wherein the downstream layer of filter material defines corrugations having a mean corrugation depth of greater than 0.23 mm.

Embodiment 15. The filter element of any one of embodiments 1-14 and 16-21, wherein the upstream layer of fibers is non-corrugated.

Embodiment 16. The filter element of any one of embodiments 1-15 and 17-21, wherein the downstream layer of filter material is self-supporting.

Embodiment 17. The filter element of any one of embodiments 1-16 and 18-21, wherein a mean void distance is defined between the downstream layer of filter media and the upstream layer of fibers.

Embodiment 18. The filter element of any one of embodiments 1-17 and 19-21, wherein the pleat density of the pleats is from 1 pleat per inch to 14 pleats per inch.

Embodiment 19. The filter element of any one of embodiments 1-18 and 20-21, wherein there are at least 5 corrugation peaks per pleat.

Embodiment 20. The filter element of any one of embodiments 1-19 and 21, wherein there are 15 to 200 corrugation peaks per pleat.

Embodiment 21. The filter element of any one of embodiments 1-20, wherein the pleats are perpendicular to the corrugation peaks.

Embodiment 22. A method of constructing a filter element, the method comprising:

creating a spacing structure on a layer of filter material depositing a layer of fibers across the spacing structure of the filter material to form filter media, wherein a void space is defined between the downstream layer of filter material and the layer of fibers;

pleating the filter media to define a first set of pleat folds and a second set of pleat folds, wherein the first set of pleat folds form an upstream face and the second set of pleat folds form a downstream face; and securing a perimeter region of the filter media to a frame component.

Embodiment 23. The method of any one of embodiments 22 and 24-38, wherein a plurality of fibers in the layer of fibers are crimped.

Embodiment 24. The method of any one of embodiments 22-23 and 25-38, wherein the layer of filter material has a capture efficiency of at least 10%.

Embodiment 25. The method of any one of embodiments 22-24 and 26-38, wherein the layer of fibers has a mean fiber diameter of at least 10 microns.

Embodiment 26. The method of any one of embodiments 22-25 and 27-38, wherein the layer of filter material has a capture efficiency from 20% to 40%.

Embodiment 27. The method of any one of embodiments 22-26 and 28-38, wherein the layer of filter material comprises wet-laid cellulose fibers.

Embodiment 28. The method of any one of embodiments 22-27 and 29-38, wherein the layer of filter material comprises synthetic fibers.

Embodiment 29. The method of any one of embodiments 22-28 and 30-38, wherein the layer of fibers is not self-supporting.

Embodiment 30. The method of any one of embodiments 22-29 and 31-38 wherein the layer of filter material comprises fibers having a mean fiber diameter from 4 to 30 microns.

Embodiment 31. The method of any one of embodiments 22-30 and 32-38, wherein forming the spacing structure comprises forming corrugations in the layer of filter material.

Embodiment 32. The method of any one of embodiments 22-31 and 33-38, wherein the layer of filter material is corrugated to have a mean corrugation depth of greater than 0.23 mm.

Embodiment 33. The method of any one of embodiments 22-32 and 34-38, wherein the layer of filter material is corrugated to have a mean corrugation depth of greater than 1.0 mm.

Embodiment 34. The method of any one of embodiments 22-33 and 35-38, wherein forming the spacing structure comprises depositing a spacing structure on an upstream surface of the layer of filter material.

Embodiment 35. The method of any one of embodiments 22-34 and 36-38, wherein the pleat density of the pleats is from 1 pleat per inch to 14 pleats per inch.

Embodiment 36. The method of any one of embodiments 22-35 and 37-38, wherein there are at least three corrugation peaks per pleat.

Embodiment 37. The method of any one of embodiments 22-36 and 38, wherein there are 5 to 20 corrugation peaks per pleat.

Embodiment 38. The filter element of any one of embodiments 22-37, wherein the pleats are perpendicular to the corrugation peaks.

Embodiment 39. A filter element comprising:

filter media in a pleated configuration having a first set of pleat folds forming an upstream face and a second set of pleat folds forming a downstream face, the filter media having a perimeter region, the filter media comprising:

a. a downstream layer of filter material, wherein the downstream layer of filter material has a capture efficiency of at least 10%; and b. an upstream layer of fibers, wherein the upstream layer of fibers has a solidity of less than 10%; and c. a spacing structure defining a mean void distance between the upstream layer of fibers and the downstream layer of filter material greater than 0.11 mm; and a frame component secured to the perimeter region of the filter media.

Embodiment 40. The filter element of any one of embodiments 39 and 41-53, wherein the upstream layer of fibers has a mean fiber diameter of at least 10 microns.

Embodiment 41. The filter element of any one of embodiments 39-40 and 42-53, wherein the downstream layer of filter material has a spacing structure protruding in a direction perpendicular to a length and a width of the filter media.

Embodiment 42. The filter element of any one of embodiments 39-41 and 43-53, wherein the spacing structure are corrugations defined by the downstream layer of filter material.

Embodiment 43. The filter element of any one of embodiments 39-42 and 44-53, wherein the spacing structure are embossments defined by the downstream layer of filter material.

Embodiment 44. The filter element of any one of embodiments 39-43 and 45-53, wherein the spacing structure are deposits disposed between the upstream layer of fibers and the downstream layer of filter material.

Embodiment 45. The filter element of any one of embodiments 39-44 and 46-53, wherein the upstream layer of fibers is not self-supporting.

Embodiment 46. The filter element of any one of embodiments 39-45 and 47-53, wherein the upstream layer of fibers is non-corrugated.

Embodiment 47. The filter element of any one of embodiments 39-46 and 48-53, wherein the downstream layer of filter material is non-corrugated.

Embodiment 48. The filter element of any one of embodiments 39-47 and 49-53, wherein the downstream layer of filter material is self-supporting.

Embodiment 49. The filter media of any one of embodiments 39-48 and 50-53, wherein the mean void distance between the upstream layer of fibers and the downstream layer of filter material is less than 1.0 mm.

Embodiment 50. The filter element of any one of embodiments 39-49 and 51-53, wherein the pleat density of the pleats is from 1 pleat per inch to 14 pleats per inch.

Embodiment 51. The filter element of any one of embodiments 39-50 and 52-53, wherein there are at least three corrugation peaks per pleat.

Embodiment 52. The filter element of any one of embodiments 39-51 and 53, wherein there are 5 to 20 corrugation peaks per pleat.

Embodiment 53. The filter element of any one of embodiments 39-52, wherein the pleats are perpendicular to the corrugation peaks.

It should also be noted that, as used in this specification and the appended claims, the phrase "configured" describes a system, apparatus, or other structure that is constructed or configured to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A filter element comprising:
filter media in a pleated configuration having a first set of pleat folds forming an upstream face and a second set of pleat folds forming a downstream face, the filter media having a perimeter region, the filter media comprising:
a downstream layer of filter material in a corrugated configuration defining peaks and valleys; and
an upstream layer of fibers extending across the peaks of the downstream layer of filter material, wherein a void space is defined between the downstream layer of filter material and the upstream layer of fibers, and the upstream layer of fibers has less than 10% solidity; and
a frame component secured to the perimeter region of the filter media.

2. The filter element of claim 1, wherein the downstream layer of filter material has a capture efficiency of at least 10%.

3. The filter element of claim 1, wherein the upstream layer of fibers is not self-supporting.

4. The filter element of claim 1, wherein the downstream layer of filter material defines corrugations having a mean corrugation depth of greater than 0.23 mm.

5. The filter element of claim 1, wherein the downstream layer of filter material is self-supporting.

6. A method of constructing a filter element, the method comprising:
creating a spacing structure on a layer of filter material;
depositing a layer of fibers across the spacing structure of the filter material to form filter media,
wherein a void space is defined between the filter material and the layer of fibers;
pleating the filter media to define a first set of pleat folds and a second set of pleat folds, wherein
the first set of pleat folds form an upstream face and the second set of pleat folds form a downstream face; and
securing a perimeter region of the filter media to a frame component.

7. The method of claim 6, wherein the layer of filter material has a capture efficiency of at least 10%.

8. The method of claim 6, wherein creating the spacing structure comprises forming corrugations in the layer of filter material.

9. The method of claim 6, wherein the layer of filter material is corrugated to have a mean corrugation depth of greater than 0.23 mm.

10. The method of claim 6, wherein creating the spacing structure comprises depositing a spacing structure on an upstream surface of the layer of filter material.

11. A filter element comprising:
filter media in a pleated configuration having a first set of pleat folds forming an upstream face and a second set of pleat folds forming a downstream face, the filter media having a perimeter region, the filter media comprising:
a downstream layer of filter material, wherein the downstream layer of filter material has a capture efficiency of at least 10%; and
an upstream layer of fibers, wherein the upstream layer of fibers has a solidity of less than 10%; and
a spacing structure defining a mean void distance between the upstream layer of fibers and the downstream layer of filter material greater than 0.11 mm; and
a frame component secured to the perimeter region of the filter media.

12. The filter element of claim 1, wherein the spacing structure comprises protrusions from the downstream layer of filter material in a direction perpendicular to a length and a width of the filter media.

13. The filter element of claim 11, wherein the spacing structure includes corrugations defined by the downstream layer of filter material.

14. The filter element of claim 11, wherein the spacing structure includes embossments defined by the downstream layer of filter material.

15. The filter element of claim 11, wherein the spacing structure includes deposits disposed between the upstream layer of fibers and the downstream layer of filter material.

16. The filter element of claim 11, wherein the upstream layer of fibers is not self-supporting.

17. The filter element of claim 11, wherein the upstream layer of fibers is non-corrugated.

18. The filter element of claim 11, wherein the downstream layer of filter material is non-corrugated.

19. The filter element of claim 11, wherein the downstream layer of filter material is self-supporting.

20. The filter media of claim 11, wherein the mean void distance between the upstream layer of fibers and the downstream layer of filter material is less than 1.0 mm.

* * * * *